(12) United States Patent
Rittenour et al.

(10) Patent No.: US 10,166,836 B2
(45) Date of Patent: Jan. 1, 2019

(54) UTILITY VEHICLE

(71) Applicant: Polaris Industries Inc., Medina, MN (US)

(72) Inventors: Michael D. Rittenour, Harris, MN (US); Derek M. Frie, Forest Lake, MN (US); William L. Barbrey, White Bear Lake, MN (US); Andrew J. Miller, Shoreview, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/642,481

(22) Filed: Jul. 6, 2017

(65) Prior Publication Data

US 2017/0368902 A1    Dec. 28, 2017

Related U.S. Application Data

(62) Division of application No. 15/191,166, filed on Jun. 23, 2016, now Pat. No. 9,738,134.

(51) Int. Cl.
| | |
|---|---|
| *B60H 1/00* | (2006.01) |
| *B60H 1/32* | (2006.01) |
| *F02B 67/04* | (2006.01) |
| *F02B 67/06* | (2006.01) |
| *B62D 63/04* | (2006.01) |
| *B62D 23/00* | (2006.01) |

(52) U.S. Cl.
CPC ......... *B60H 1/005* (2013.01); *B60H 1/00007* (2013.01); *B60H 1/0045* (2013.01); *B60H 1/00357* (2013.01); *B60H 1/3222* (2013.01); *B62D 63/04* (2013.01); *F02B 67/04* (2013.01); *F02B 67/06* (2013.01); *B60Y 2200/20* (2013.01); *B62D 23/005* (2013.01); *F02B 2275/06* (2013.01)

(58) Field of Classification Search
CPC combination set(s) only.
See application file for complete search history.

(56) References Cited

U.S. PATENT DOCUMENTS

| | | | |
|---|---|---|---|
| 5,129,375 A | 7/1992 | Takane | |
| 5,976,044 A | 11/1999 | Kuyama | |
| 7,013,646 B1* | 3/2006 | Serkh | ............................... 60/698 |
| 7,878,285 B2 | 2/2011 | Oda | |

(Continued)

FOREIGN PATENT DOCUMENTS

JP    2008308121    12/2008

OTHER PUBLICATIONS

International Search Report and Written Opinion of the International Searching Authority, dated Sep. 27, 2017, for related International patent application No. PCT/US2017/038985; 15 pages.

*Primary Examiner* — Nicole T Verley
(74) *Attorney, Agent, or Firm* — Faegre Baker Daniels LLP

(57) ABSTRACT

A utility vehicle includes a plurality of ground-engaging members, a frame supported by the ground-engaging members, a powertrain assembly supported by the frame which includes an engine, an alternator coupled to the engine through a housing, and a heating, ventilation, and air condition ("HVAC") assembly including a compressor operably coupled to the engine. The compressor is supported on a first side of the housing plate and the alternator is supported on a second side of the housing.

20 Claims, 22 Drawing Sheets

(56) References Cited

U.S. PATENT DOCUMENTS

| | | | |
|---|---|---|---|
| 8,104,524 B2 | 1/2012 | Manesh | |
| 8,176,957 B2 | 5/2012 | Manesh | |
| 8,870,711 B2 * | 10/2014 | Pohl | F02B 67/04 |
| | | | 180/53.8 |
| 8,997,908 B2 | 4/2015 | Kinsman | |
| 9,273,760 B2 * | 3/2016 | Pohl | F16H 15/52 |
| 2004/0172955 A1 * | 9/2004 | Runk | B60H 1/322 |
| | | | 62/133 |
| 2005/0181905 A1 * | 8/2005 | Ali | F02B 67/06 |
| | | | 475/210 |
| 2006/0107920 A1 * | 5/2006 | Serkh | F02B 63/04 |
| | | | 123/198 R |
| 2009/0263259 A1 * | 10/2009 | Picton | H02K 7/1815 |
| | | | 417/364 |
| 2010/0078253 A1 * | 4/2010 | Rolfe | B60H 1/3202 |
| | | | 180/302 |
| 2012/0258839 A1 * | 10/2012 | Smithson | B60H 1/3222 |
| | | | 477/42 |
| 2014/0265285 A1 | 9/2014 | Erspamer | |
| 2015/0047917 A1 | 2/2015 | Burt | |
| 2016/0023621 A1 * | 1/2016 | Books | G01R 19/0092 |
| | | | 701/36 |
| 2016/0090958 A1 * | 3/2016 | Berkson | F02N 11/0833 |
| | | | 701/112 |

* cited by examiner

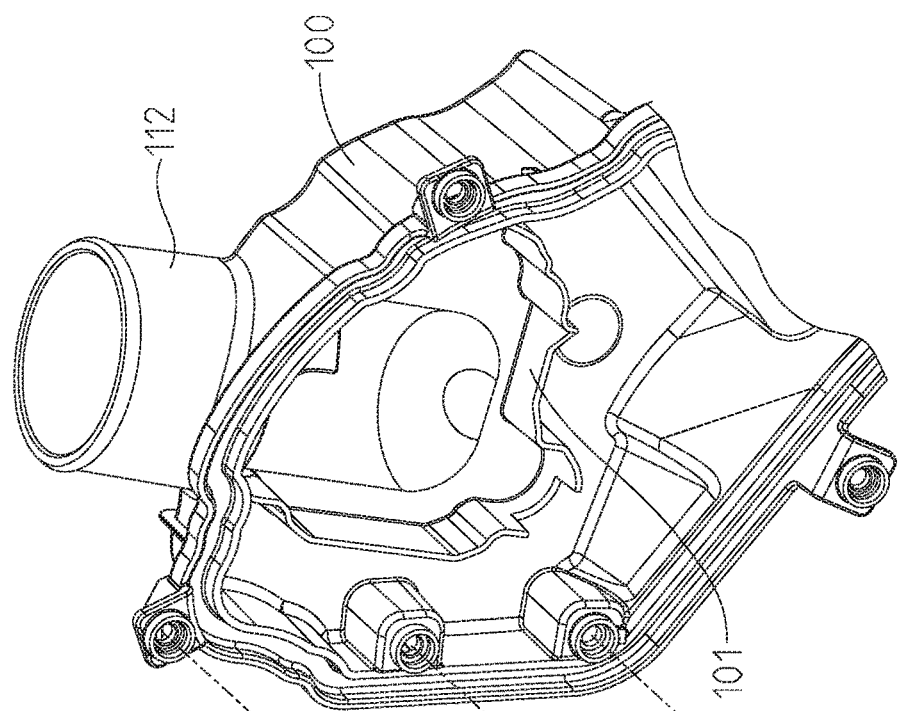
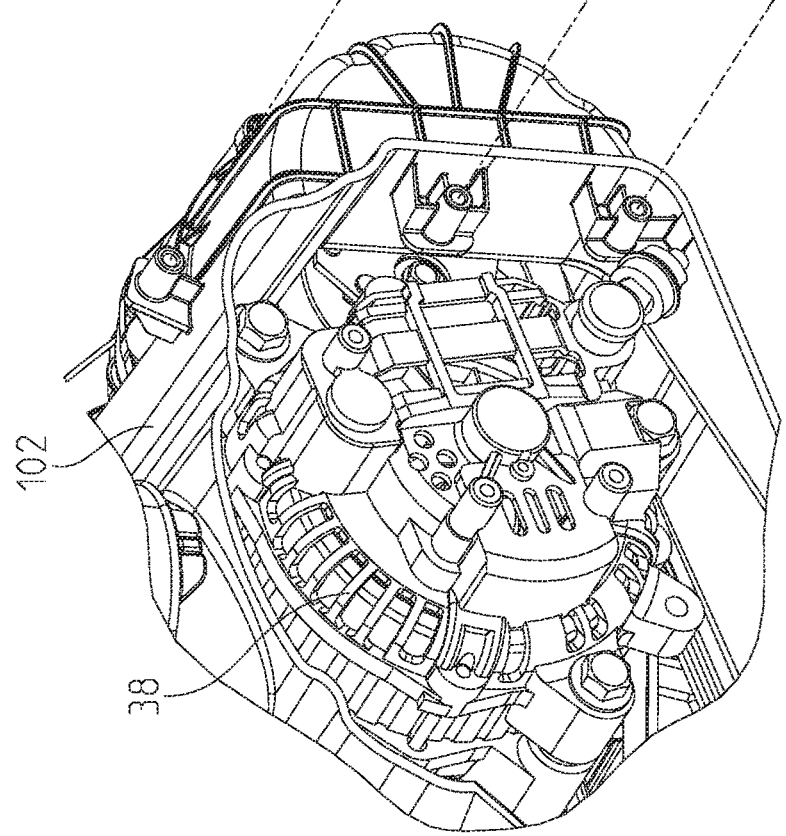
Fig. 13

UTILITY VEHICLE

CROSS-REFERENCE TO RELATED APPLICATIONS

The present application is a divisional of U.S. patent application Ser. No. 15/191,166, filed on Jun. 23, 2016, entitled "UTILITY VEHICLE", the complete disclosure of which is expressly incorporated by reference herein.

FIELD OF THE DISCLOSURE

The present invention relates to a utility vehicle and, more particularly, to an all-terrain utility vehicle with an enclosed cab having a heating, ventilation, and air conditioning assembly.

BACKGROUND OF THE DISCLOSURE

Generally, all-terrain vehicles ("ATVs") and utility vehicles ("UVs") are used to carry one or more passengers and/or cargo over a variety of terrains. Because ATVs and UVs are configured to be used in a variety of climates, ATVs and UVs may be used in very warm climates and during hot periods of the day. As such, for the comfort of the operator and/or the passengers, various ATVs and UVs may be provided with an enclosed cab to shield the operator and the passengers from the sun. However, providing an ATV or UV with a heating, ventilation, and air conditioning assembly may further increase the comfort of the operator and the passengers.

SUMMARY OF THE DISCLOSURE

According to an illustrative embodiment of the present disclosure, a utility vehicle comprises a plurality of ground-engaging members, a frame supported by the ground-engaging members, a powertrain assembly supported by the frame which includes an engine, an alternator coupled to the engine through a housing, and a heating, ventilation, and air condition ("HVAC") assembly which includes a compressor operably coupled to the engine. The compressor is supported on a first side of the housing plate and the alternator is supported on a second side of the housing.

According to another illustrative embodiment of the present disclosure, a utility vehicle comprises a plurality of ground-engaging members, a frame supported by the ground-engaging members, a powertrain assembly supported by the frame which includes an engine, an alternator coupled to the engine through a housing, a belt drive assembly positioned within the housing which includes a belt, and a heating, ventilation, and air condition ("HVAC") assembly which includes a compressor operably coupled to the engine through the belt drive assembly. The compressor, the belt drive assembly, and the alternator are sealed with the housing.

According to a further illustrative embodiment of the present disclosure, a utility vehicle comprises a plurality of ground-engaging members, a frame supported by the ground-engaging members, a powertrain assembly supported by the frame which includes an engine, an alternator coupled to the engine through a housing, a belt drive assembly positioned within the housing which includes a belt, and a heating, ventilation, and air condition ("HVAC") assembly which includes a compressor operably coupled to the engine through the belt drive assembly. The compressor, the belt drive assembly, and the alternator are sealed with the housing, and the housing includes an air inlet and air is drawn into the housing through the air inlet by the alternator.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 13 is an exploded of the alternator and an inner surface of the housing;

Figure 1:
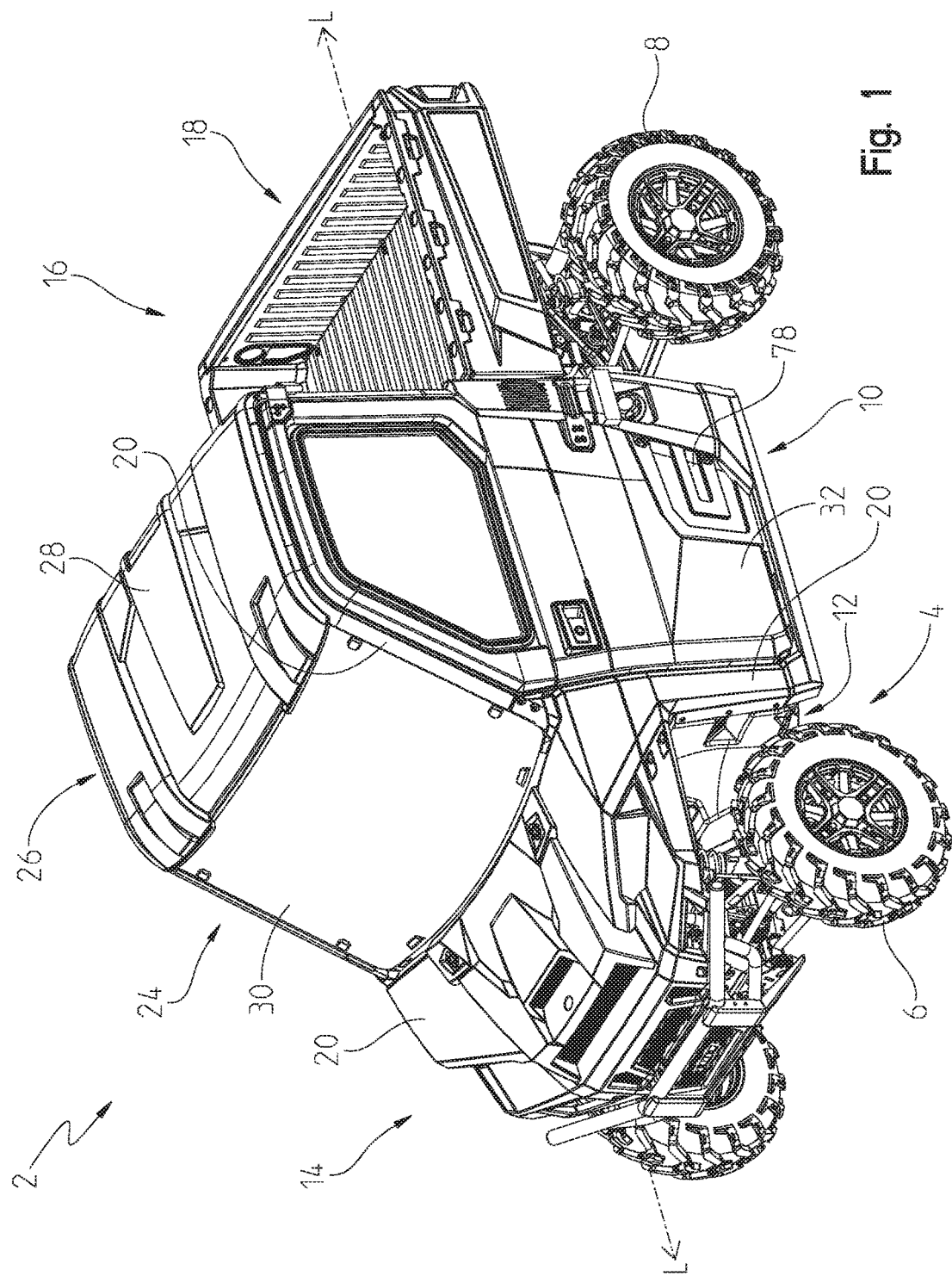
FIG. 1 is a front left perspective view of a utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIG. 1, an illustrative embodiment of a utility vehicle 2 is shown. Vehicle 2 is configured for off-road conditions. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries Inc., located at 2100 Highway 55 in Medina, Minn. 55340, or non-pneumatic tires, such as those shown in U.S. Pat. No. 8,176,957 and U.S. Pat. No. 8,104,524, the complete disclosures of which are expressly incorporated herein by reference.

Vehicle 2 further includes a frame assembly 10 (FIG. 4) supported above a ground surface G by ground-engaging members 4. Frame assembly 10 extends along a longitudinal centerline or axis L of vehicle 2 (FIG. 1). Frame assembly 10 includes a lower frame assembly 12 extending from a front end portion 14 to a rear end portion 16 of vehicle 2. Lower frame assembly 12 supports a rear cargo area 18 and a vehicle body 20, which includes a plurality of body panels.

Additionally, and as shown in FIG. 1, frame assembly 10 includes an upper frame assembly 22 extending vertically above lower frame assembly 12 and, more particularly, above an operator area 24 of vehicle 2. Operator area 24 includes seating 34 (FIG. 4) for an operator and one or more passengers. Referring still to FIG. 1, operator area 24 may be enclosed by a cab assembly 26 which, illustratively, includes a roof 28, a front windshield 30, a rear windshield (not shown), and doors 32. Front windshield 30, doors 32, the rear windshield, and roof 28 may be coupled to upper frame assembly 22. Additionally, doors 32 may be coupled to or otherwise cooperate with body 20 to enclose a portion of operator area 24. Various aspects of vehicle 2 may be disclosed further in U.S. patent application Ser. No. 14/212,092, filed Mar. 14, 2014, and entitled "UTILITY VEHICLE"; Ser. No. 14/458,839, filed Aug. 13, 2014, and entitled "SIDE-BY-SIDE VEHICLE"; Ser. No. 15/154,098, filed May 13, 2016, and entitled "UTILITY VEHICLE"; and Ser. No. 13/492,589, filed Jun. 8, 2012, and entitled "SIDE-BY-SIDE ALL TERRAIN VEHICLE", the complete disclosures of which are expressly incorporated by reference herein.

Referring to FIGS. 2-5, vehicle 2 includes a powertrain assembly 40 which includes an engine 42 and a transmission (not labeled). The transmission of vehicle 2 may be any type of transmission, such as a shiftable transmission and/or a continuously variable transmission operably coupled to engine 42. Engine 42 is operably coupled to front and rear ground engaging members 6, 8 through front and/or rear drives and a prop shaft (not shown). Engine 42 may be any type of fuel-driven engine and/or may be or include an electrical motor configured for hybrid and/or electrical operation of vehicle 2. Powertrain assembly 40 also may include a belt drive assembly 55 which includes a belt 56, an idler pulley 126, and a drive pulley 132, as disclosed further herein. In one embodiment, belt 56 may be a six-rib, micro-V belt.

Figure 3:
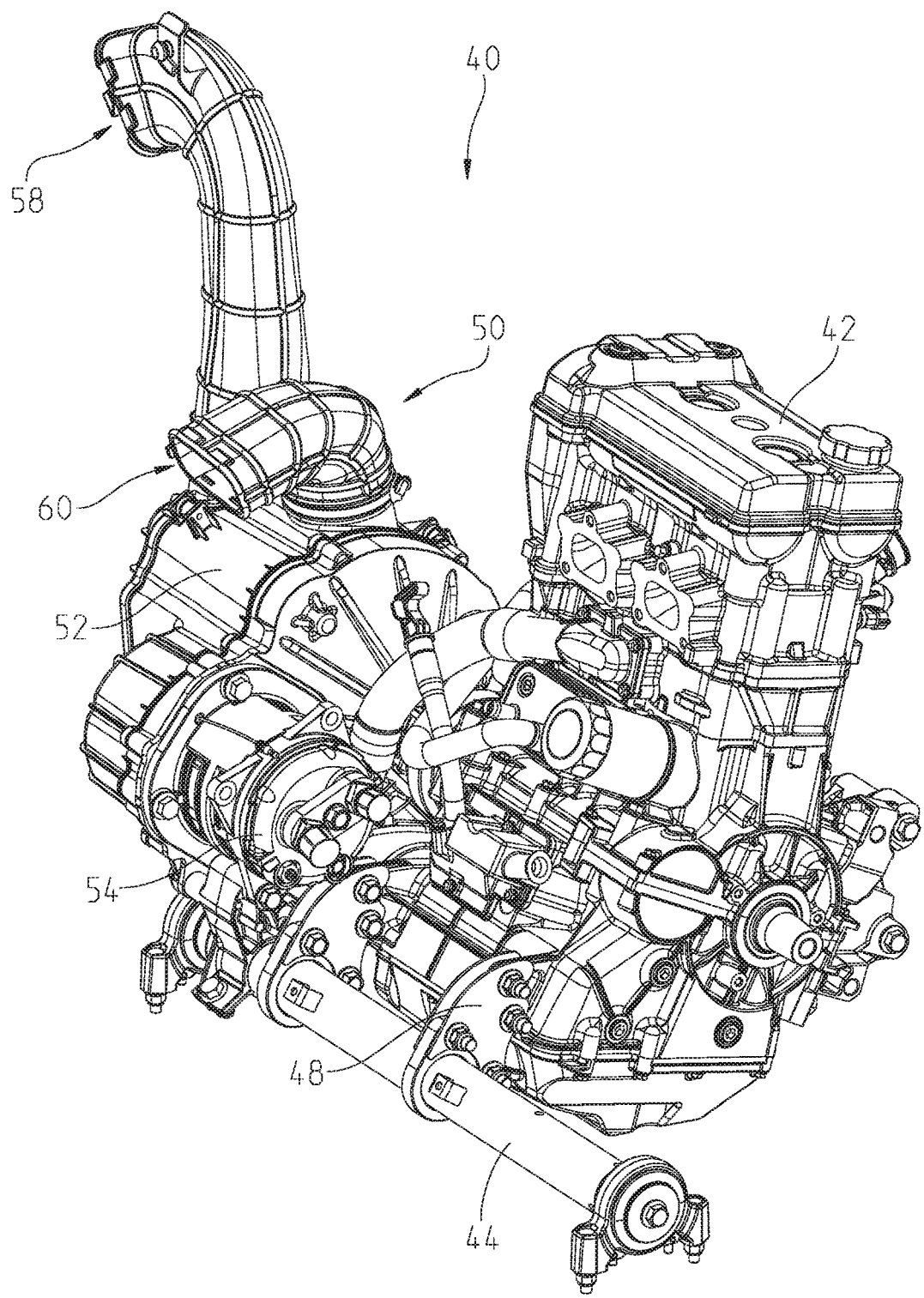
FIG. 3 is a front left perspective view of the powertrain assembly and the housing of FIG. 2.
Figure 4:
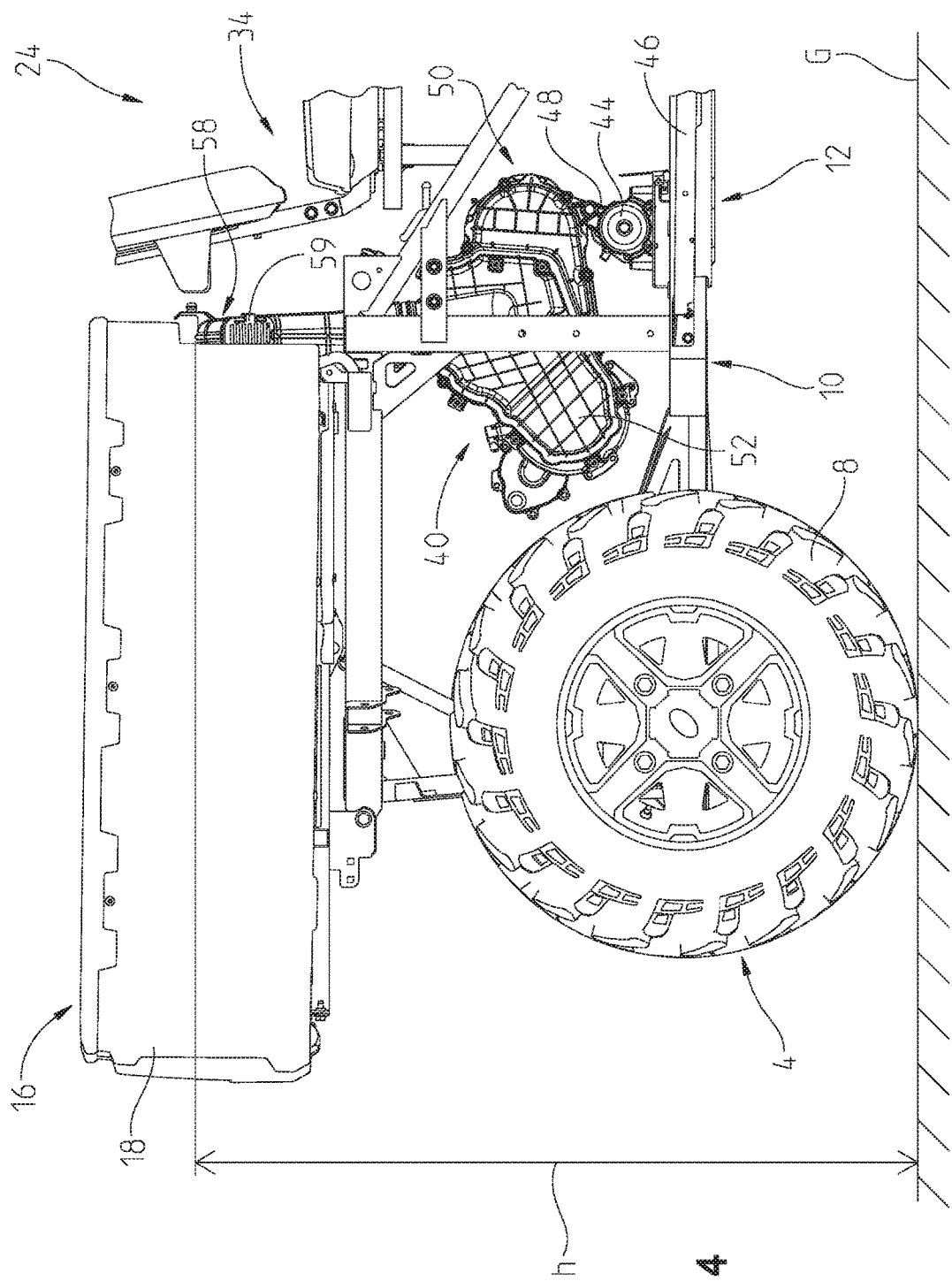
FIG. 4 is a right side view of a rear portion of the vehicle of FIG. 1 supporting the powertrain assembly and the housing of FIG. 3.
Figure 5:
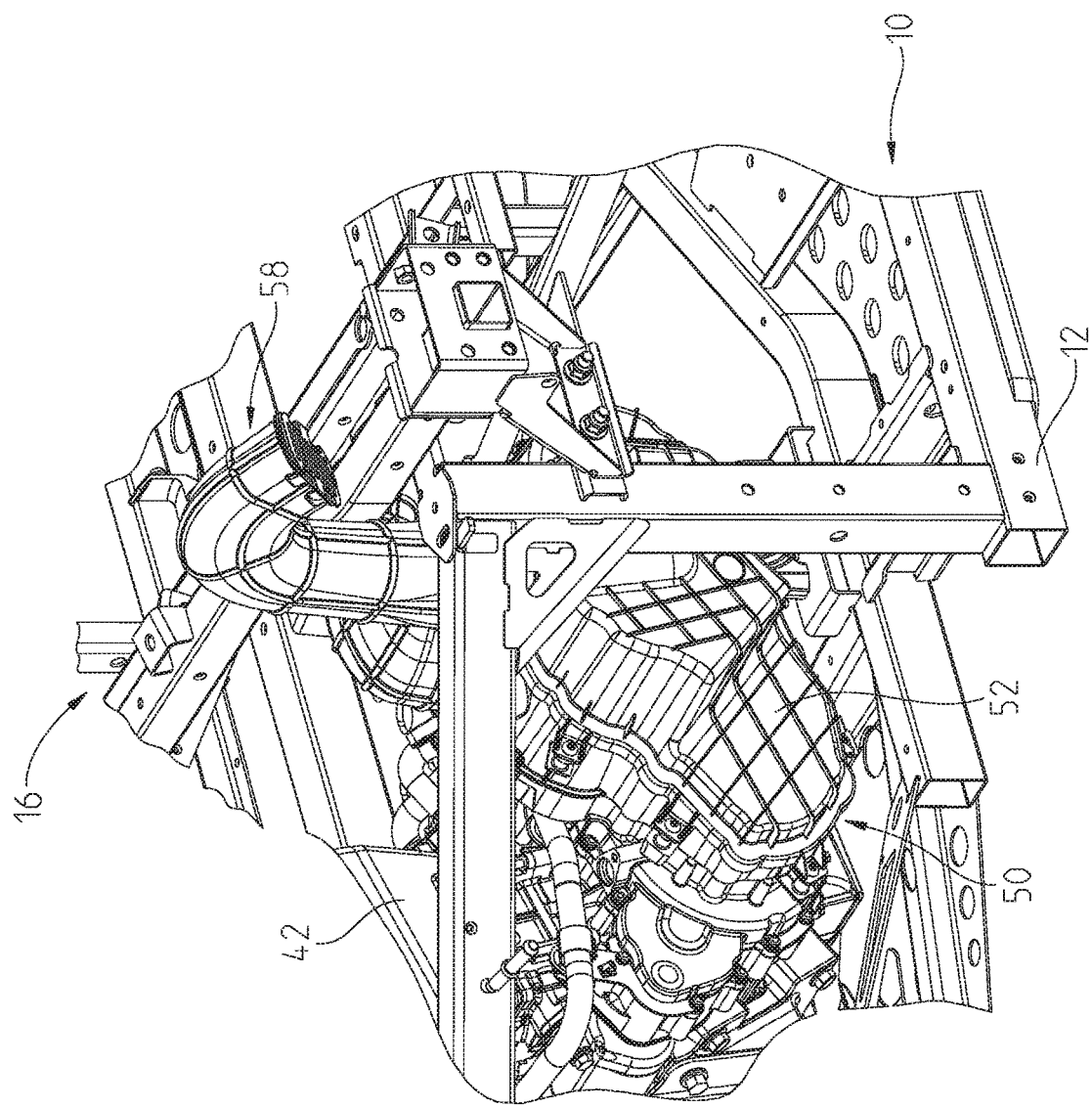
FIG. 5 is a rear right perspective view of the rear portion of the vehicle of FIG. 4 supporting the powertrain assembly and the housing.

As shown in FIGS. 4 and 5, engine 42 is supported at rear end portion 16 of vehicle 2 and is coupled to lower frame assembly 12. More particularly, lower frame assembly 12 includes an engine mount member 44 which, illustratively, extends generally transverse to longitudinal axis L of vehicle 2 and is coupled to lower longitudinally-extending frame members 46 of lower frame assembly 12, as shown in FIGS. 3-5. For example, engine 42 may include brackets 48 which are configured to be received by or otherwise coupled to engine mount member 44.

Figure 2:
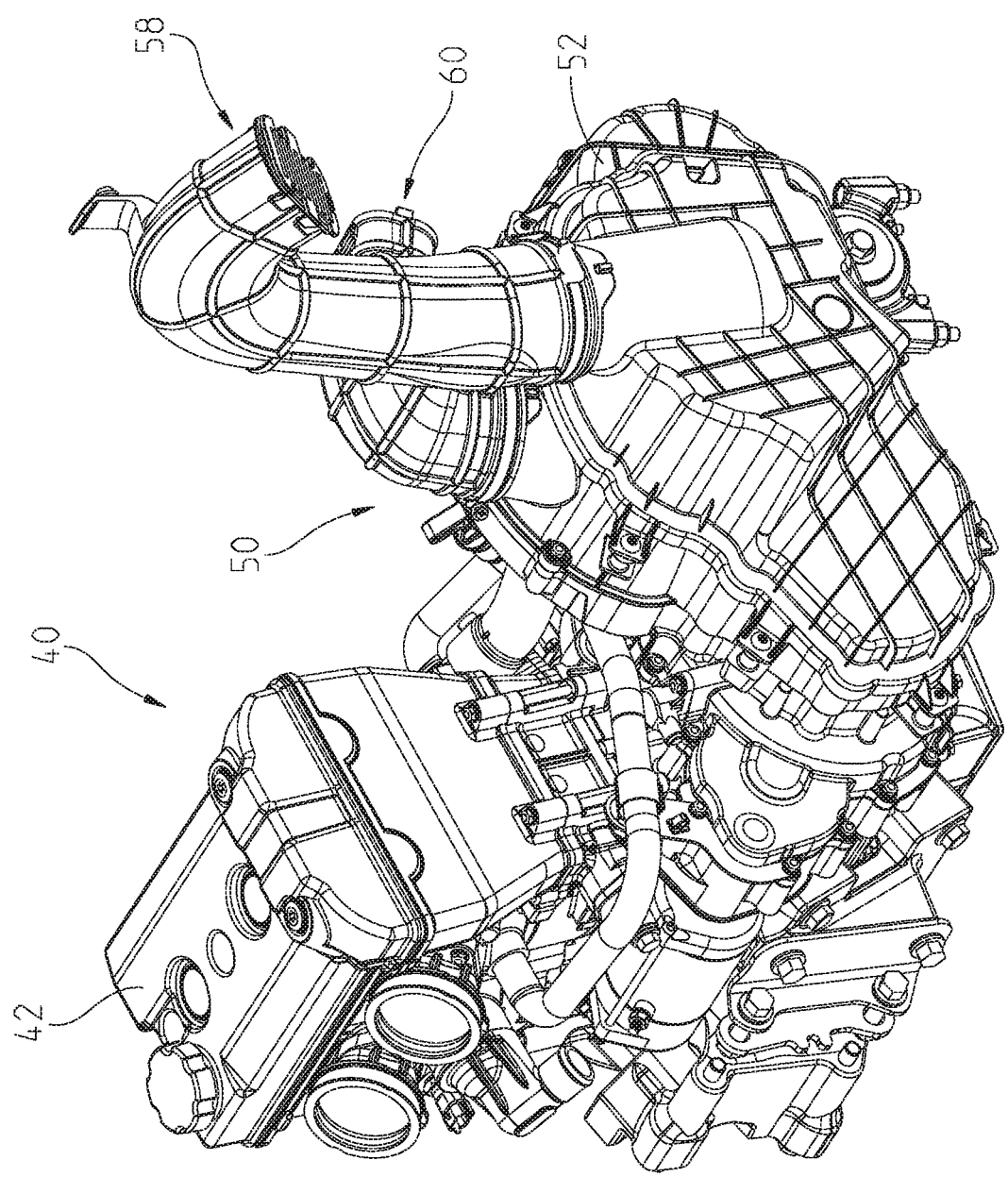
FIG. 2 is a rear right perspective view of a powertrain assembly coupled to a housing for an alternator and a portion of a heating, ventilation, and air condition ("HVAC") assembly for the vehicle of FIG. 1.

In addition to the transmission of vehicle 2, engine 42 also is coupled to a heating, air conditioning, and ventilation ("HVAC") assembly 50 of vehicle 2. In one embodiment, and as shown in FIGS. 2-9, HVAC assembly 50 includes at least a housing 52, a compressor 54, a condenser 62, a receiver-drier 64, an evaporator housing 65, a fresh-air filter 67, a blower (not shown), an intake filter 66, an air plenum 68, at least one output vent 70, a metering valve 71, and cooling lines 72. As shown in FIGS. 2-5, housing 52 of HVAC assembly 50 is coupled to engine 42. Housing 52 is configured to support at least compressor 54, belt 56, and an alternator 38 of the electrical system of vehicle 2. In one embodiment, alternator 38 is a magneto which includes at least one internal fan 39 (FIG. 12) configured with blades which rotate within the body of alternator 38. As shown in FIG. 2, housing 52 includes an air inlet 58 and an air outlet 60 for cooling at least compressor 54, alternator 38, and belt 56 supported within housing 52.

Figure 6:
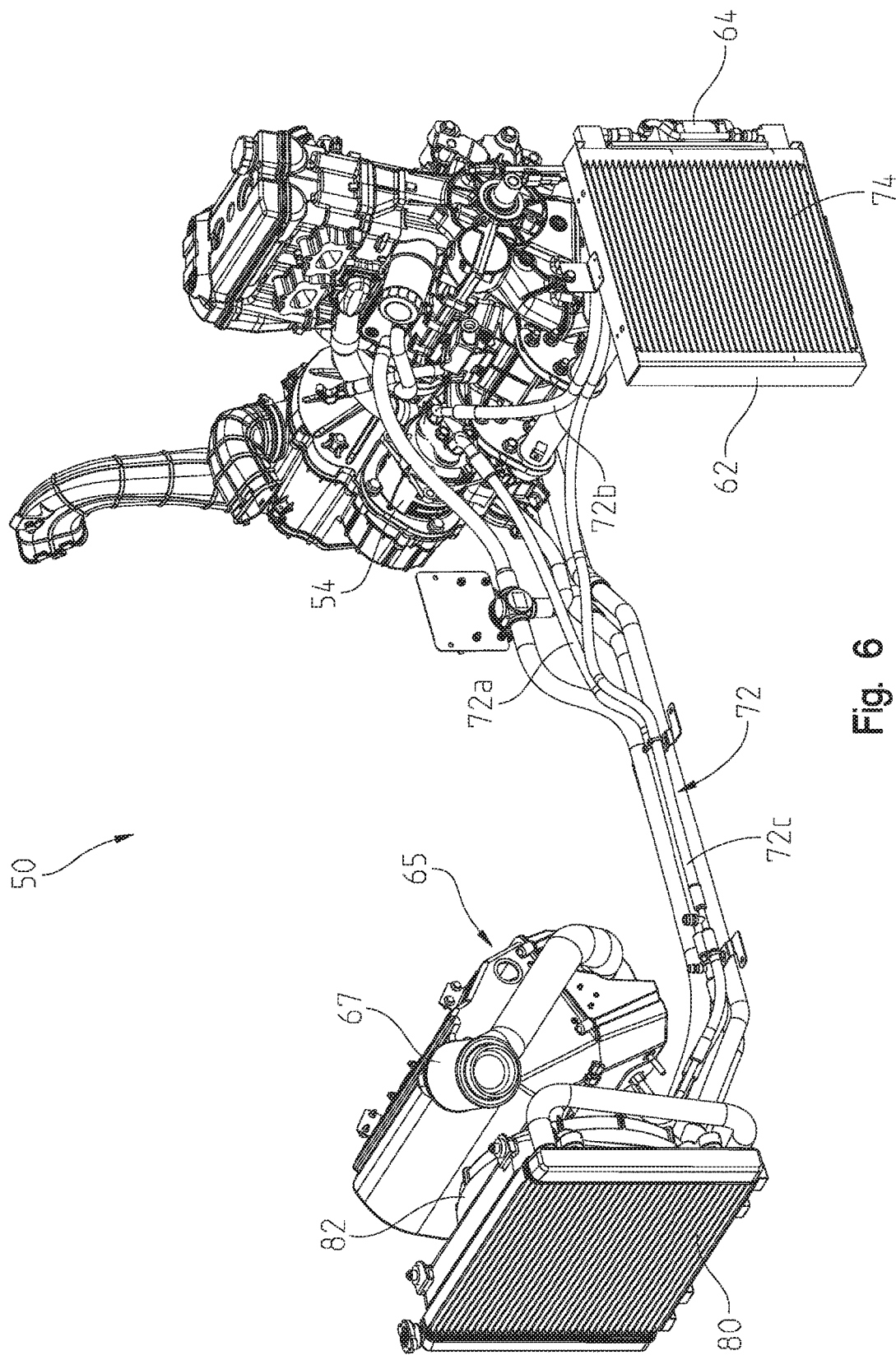
FIG. 6 is a front left perspective view of the powertrain assembly and the HVAC assembly for the vehicle of FIG. 1.
Figure 7:
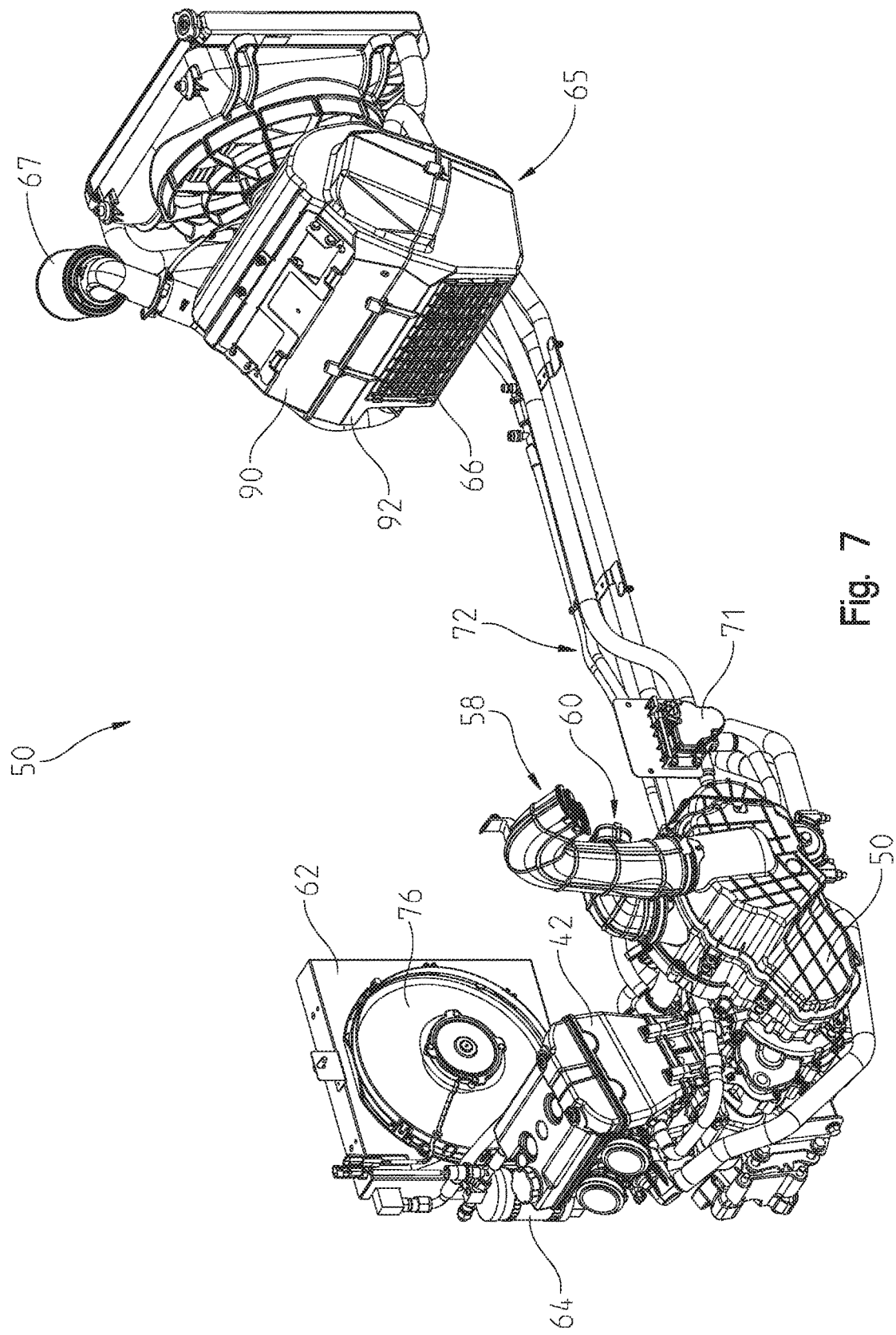
FIG. 7 is a rear right perspective view of the powertrain assembly and the HVAC assembly of FIG. 6.

As shown in FIGS. 6 and 7, condenser 62 of HVAC assembly 50 is comprised of a plurality of cooling coils 74 to cool refrigerant from compressor 54. To facilitate cooling, condenser 62 is coupled to a fan 76 that is positioned inwardly therefrom, as shown in FIG. 7. Fan 76 increases air flow through condenser 62 and also may provide additional cooling across engine 42. More particularly, fan 76 draws ambient air from outside of utility vehicle 2 into condenser 62 to cool the refrigerant in condenser 62. Illustratively, condenser 62 is positioned below seating 34 and may include a pre-filter screen 78, as shown in FIG. 1. Pre-filter screen 78 prevents grass, dirt, stones, and other debris from entering condenser 62.

Referring to FIGS. 6 and 7, condenser 62 is fluidly coupled to evaporator housing 65. More particularly, illustrative condenser 62 is coupled to evaporator housing 65 via receiver-drier 64. Condenser 62 is coupled to receiver-drier 64, which is fluidly coupled to evaporator housing 65 via cooling lines or hoses 72.

Figure 8:
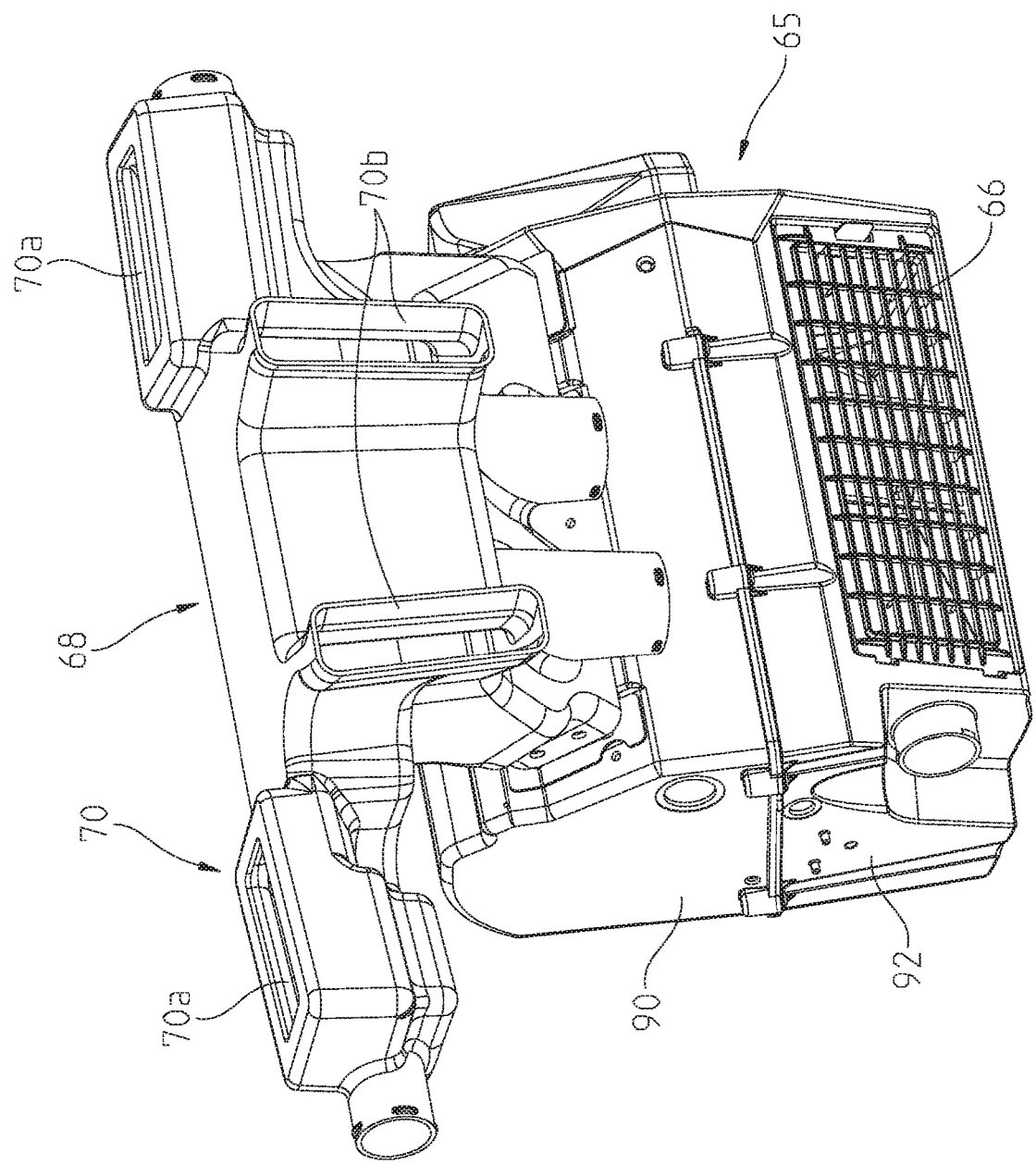
FIG. 8 is a rear left perspective view of an air plenum and an evaporator housing of the HVAC assembly of FIG. 6.
Figure 9:
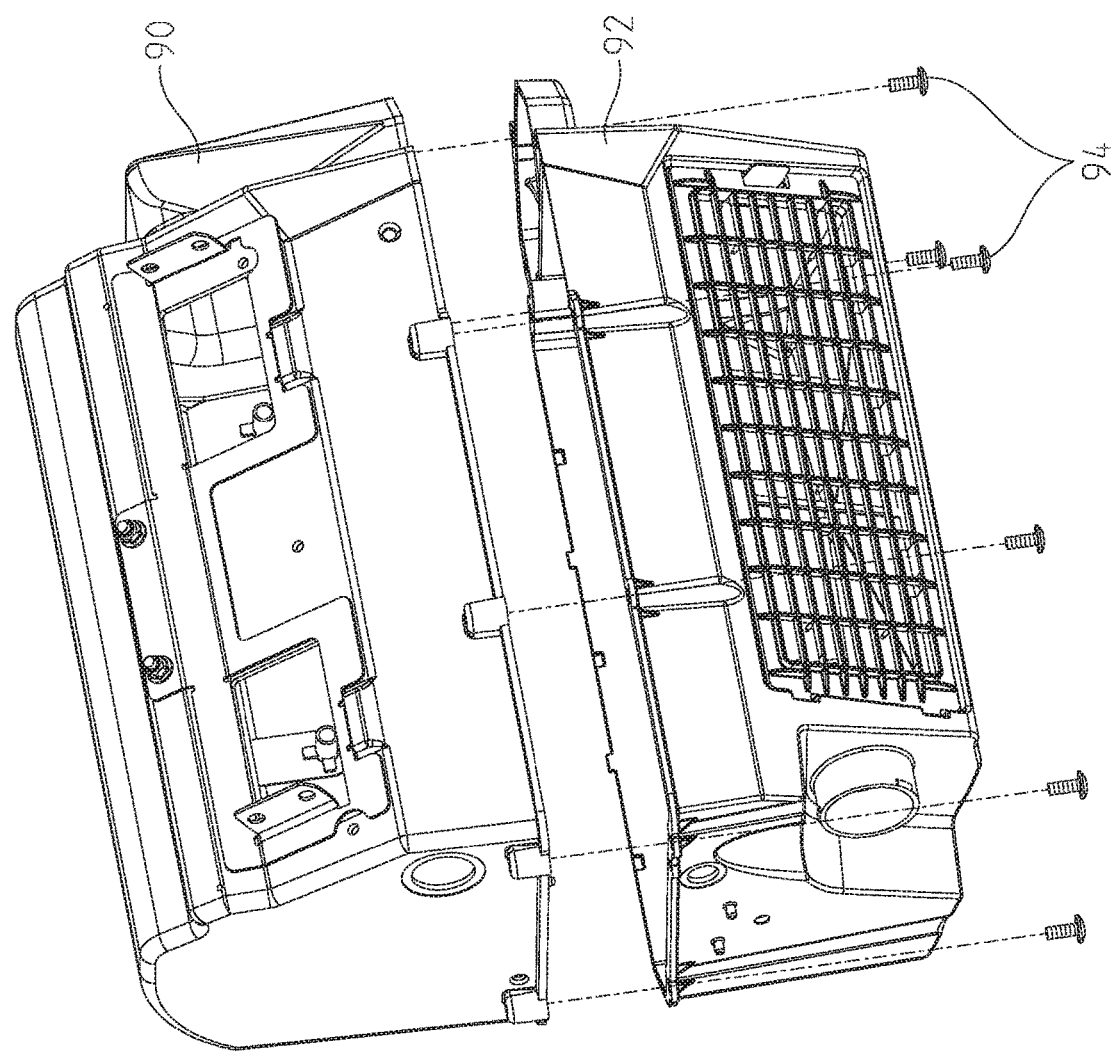
FIG. 9 is an exploded view of the evaporator housing of FIG. 8.

Referring still to FIGS. 6 and 7, evaporator housing 65 is positioned at front end portion 14 of vehicle 2. Illustratively, evaporator housing 65 is positioned longitudinally rearward of a radiator 80 and a radiator fan 82 of vehicle 2. Evaporator housing 65 is positioned within a portion of operator area 24. As shown in FIGS. 8 and 9, in one embodiment, evaporator housing 65 includes an upper housing member 90 and a lower housing member 92. Lower housing member 92 may include or otherwise support filter 66 and is configured as a heater unit with a heater core and blower (not shown) to supply warm air to operator area 24. Illustratively, lower housing member 92 is fluidly coupled to fresh-air filter 67 for operation of the heater unit. Upper housing member 90 is coupled to lower housing member 92 with fasteners 94. Lower housing member 92 is configured as an air conditioning unit to supply cool air to operator area 24. In this way, HVAC assembly 50 can provide heating and cooling to operator area 24 when upper housing member 90 is coupled to lower housing member 92.

Figure 10:
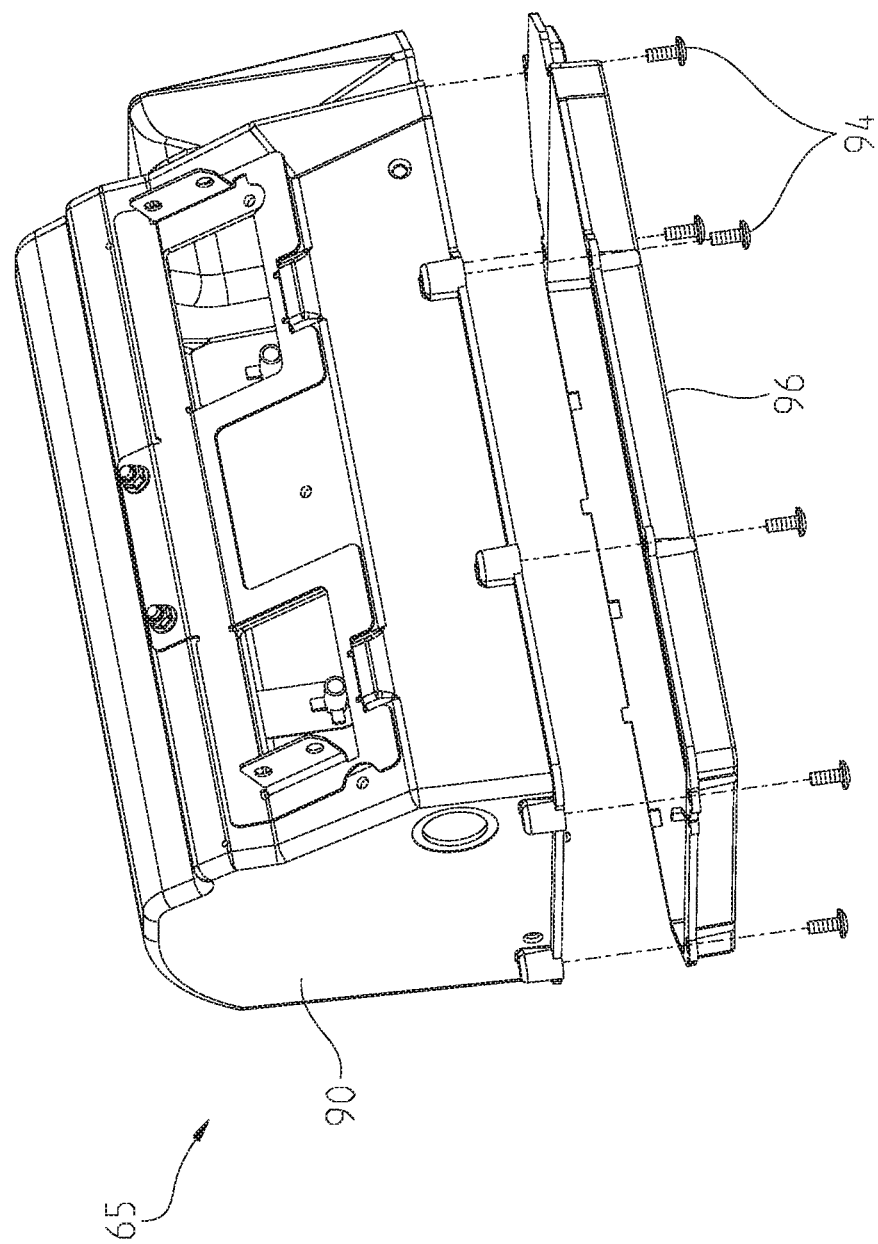
FIG. 10 is an exploded view of a heater unit of the evaporator housing of FIG. 9.

Alternatively, evaporator housing 65 may be configured with an alternative lower housing member 96 coupled to upper housing member 90, as shown in FIG. 10. Alternative lower housing member 96 also is configured to receive fasteners 94 to couple with upper housing member 90. As such, evaporator housing 65 may only be comprised of the heater unit defined by upper housing member 90. Therefore, a user may only choose to include a heater unit on vehicle 2 or may choose to include both a heating and air conditioning unit on vehicle 2 by adding lower housing member 92 and filter 66 in place of alternative lower housing member 96.

Referring to FIG. 8, when evaporator housing 65 includes an air conditioning unit (i.e., lower housing member 92), evaporator housing 65 includes an evaporator (not shown) which is fluidly coupled to filter 66. The blower (not shown) within evaporator housing 65 draws air from operator area 24 into evaporator housing 65. Filter 66 prevents particulates and other debris in the air from entering evaporator housing 65. The blower also allows air from evaporator housing 65 to flow into operator area 24 through vents 70, as is detailed further herein.

Evaporator housing 65 is fluidly coupled to plenum 68 in order to provide warm or cool air to operator area 24. More particularly, as shown in FIGS. 8-10, plenum 68 is positioned above evaporator housing 65 and is supported within a dashboard assembly (not shown). Vents 70 also are positioned within the dashboard assembly but are open to operator area 24. Illustratively, HVAC assembly 50 includes two upper vents 70a positioned adjacent windshield 30 (FIG. 1) and a plurality of operator vents 70b extending across the dashboard assembly and directed toward an operator and a passenger. More particularly, upper vents 70a defrost front windshield 30, while operator vents 70b are generally positioned for providing warm or cool air directly to operator area 24. Other embodiments of HVAC assembly 50 may include other arrangements and quantities of vents 70.

Figure 11:
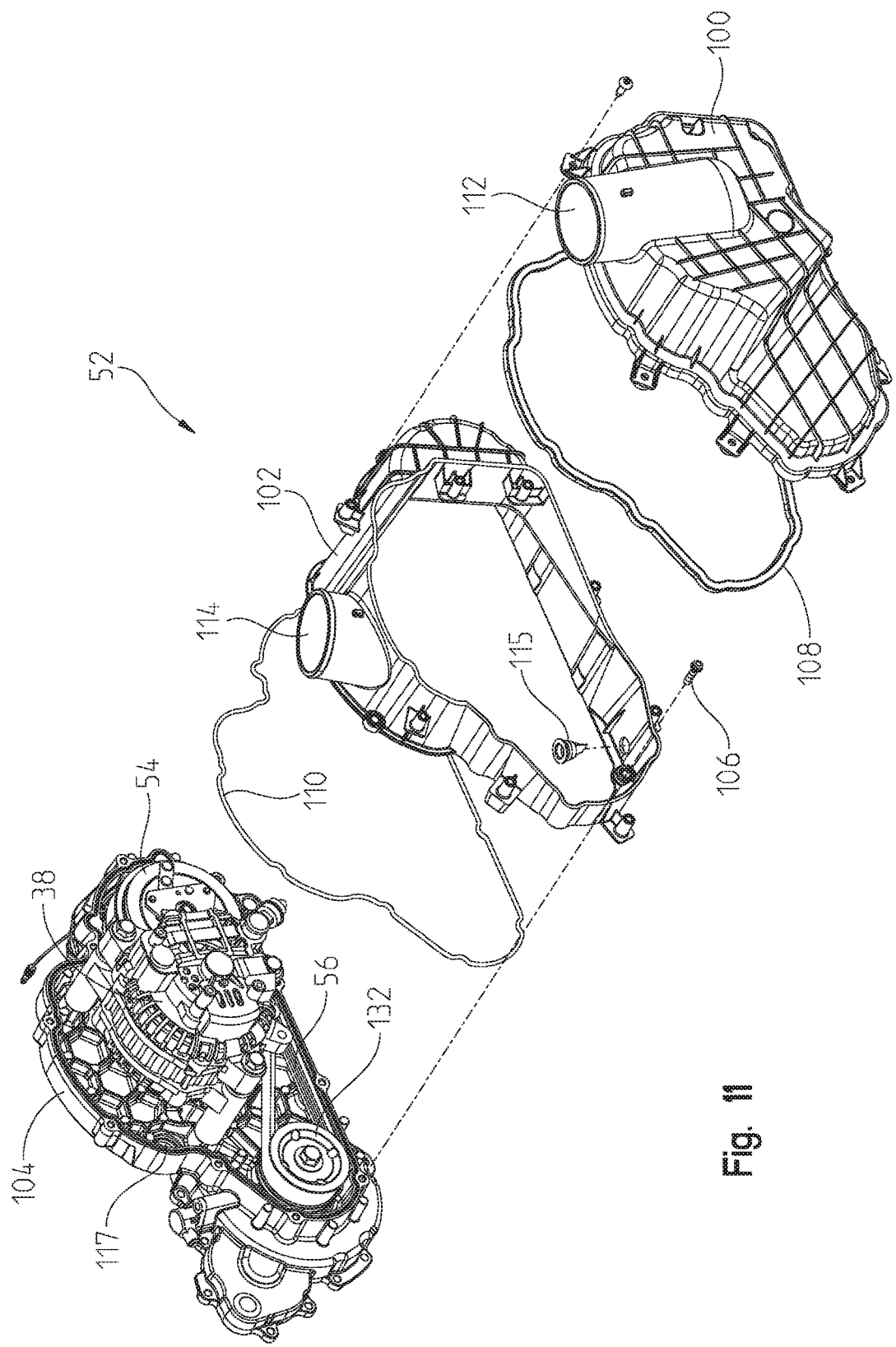
FIG. 11 is an exploded view of the housing of FIG. 2.

Referring to FIGS. 11-13, housing 52 of HVAC assembly 50 includes an outer housing member 100, and intermediate housing member 102, and an inner housing member or support plate 104. As shown in FIG. 11, outer housing member 100 includes an air inlet port 112 which is fluidly coupled to air inlet 58 (FIG. 2) for allowing air to enter housing 52 for cooling the components therein. More particularly, fan(s) 39 of alternator 38 are configured to draw air into housing 52 via air inlet 58 and air inlet port 112 for cooling at least belt 56, alternator 38, belt 56, and a portion of compressor 54. For example, as shown in FIG. 13, outer housing member 100 includes an internal rib 101 which is configured to cooperate with the outer surface of alternator 38 to direct air into housing 52 and through alternator 38 to cool alternator 38. As such, rib 101 of outer housing member 100 is configured to direct air towards alternator 38. More particularly, rib 101 is configured to generally surround the outer surface of alternator 38 to direct air through air inlet port 112 toward alternator 38 when air is drawn into housing 52 with fan 39 of alternator 38. In this way, the inner surface of outer housing member 100 defines an air flow path to route area toward specific components or in specific directions within housing 52.

Additionally, intermediate housing member 102 includes an air outlet port 114 which is fluidly coupled to air outlet 60 (FIG. 2) for allowing warm or hot air to exit housing 52 after cooling the components therein. By positioning air inlet and outlet ports 112, 114 at an upper surface of housing 52, fluids (e.g., water) do not enter housing even if vehicle 2 travels through puddles, rivers, creeks, etc. However, as shown in FIG. 11, intermediate housing member 102 also includes a drain port 115, illustrative a duckbill, which drains any fluids within housing 52 to the outside of vehicle 2 but prevents fluids from entering housing 52 therethrough. As shown in FIG. 4, air inlet 58 is positioned a forward portion of cargo area 18 such that air inlet 58 is intermediate operator area 24 and cargo area 18. Air inlet 58 is spaced above ground surface G by a height h which decreases the likelihood that water or dirt on ground surface G will enter housing 52, as disclosed herein.

Illustratively, outer, intermediate, and inner housings members 100, 102, 104 are sealingly coupled together through fasteners, such as fasteners 106. Alternatively, housing 52 may be configured as a single component. As shown in FIG. 11, housing 52 includes a first seal 108 configured to seal outer housing member 100 to intermediate housing member 102 and a second seal 110 configured to seal intermediate housing member 102 to inner housing member 104. In this way, housing 52 is hermetically sealed to prevent fluids, dirt, or debris from entering housing 52. As such, only cooling air enters housing 52 through air inlet 58 and air inlet port 112; however, the cooling air may be filtered by a filter 59 (FIG. 4) before entering housing 52.

Additionally, by making housing 52 modular, it may be necessary to only remove a portion of housing 52 (e.g., outer housing member 100), but not the entire housing 52, when servicing components therein. Yet, when outer, intermediate, and inner housing members 100, 102, 104 are coupled together and sealed against each other, housing 52 prevents rocks, dirt, dust, debris, and fluids from entering housing 52.

Figure 12A:
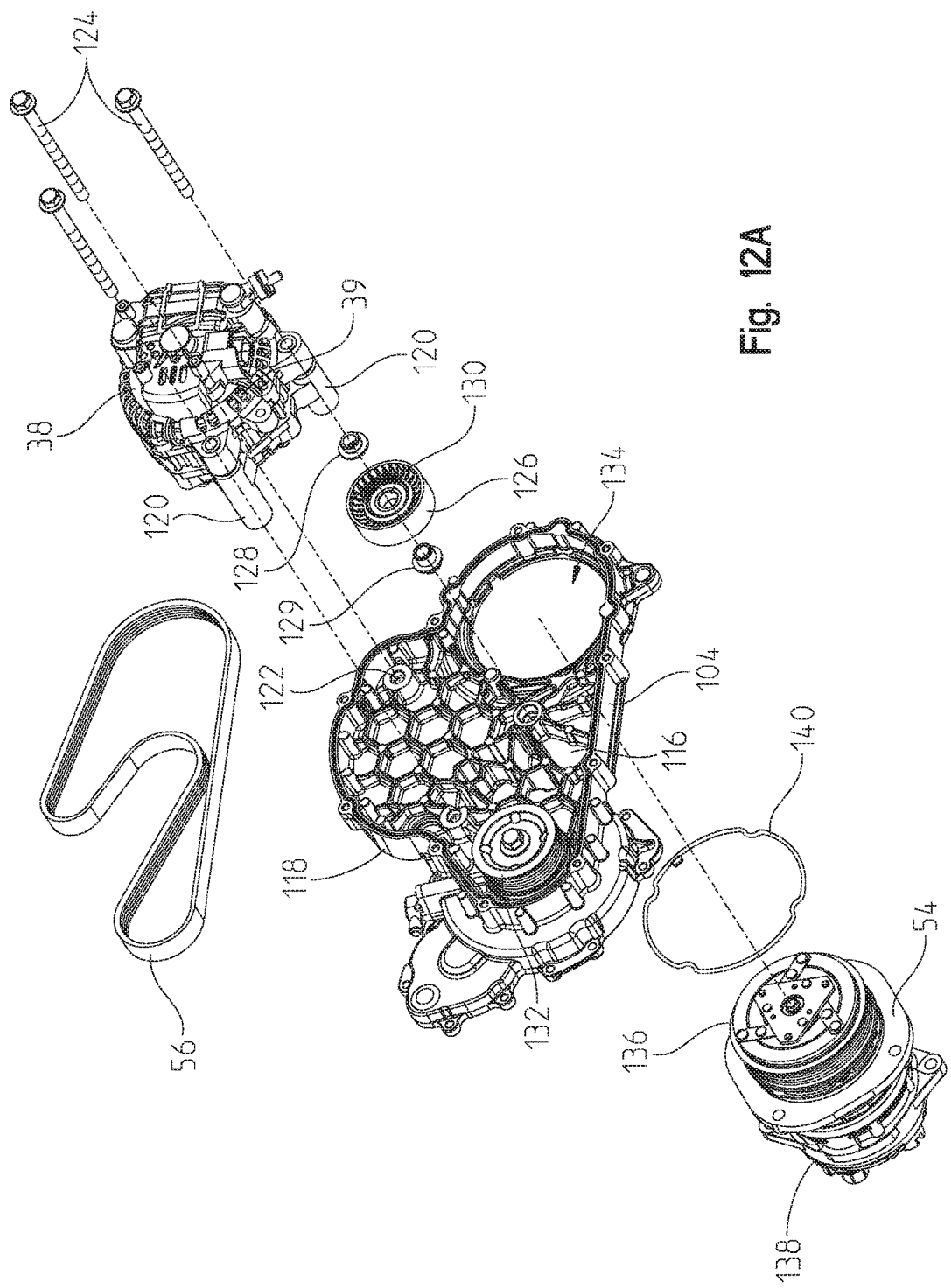
FIG. 12A is an exploded view of a support plate of the housing, the alternator, a drive belt, and a compressor of the HVAC assembly of FIG. 6.
Figure 12B:
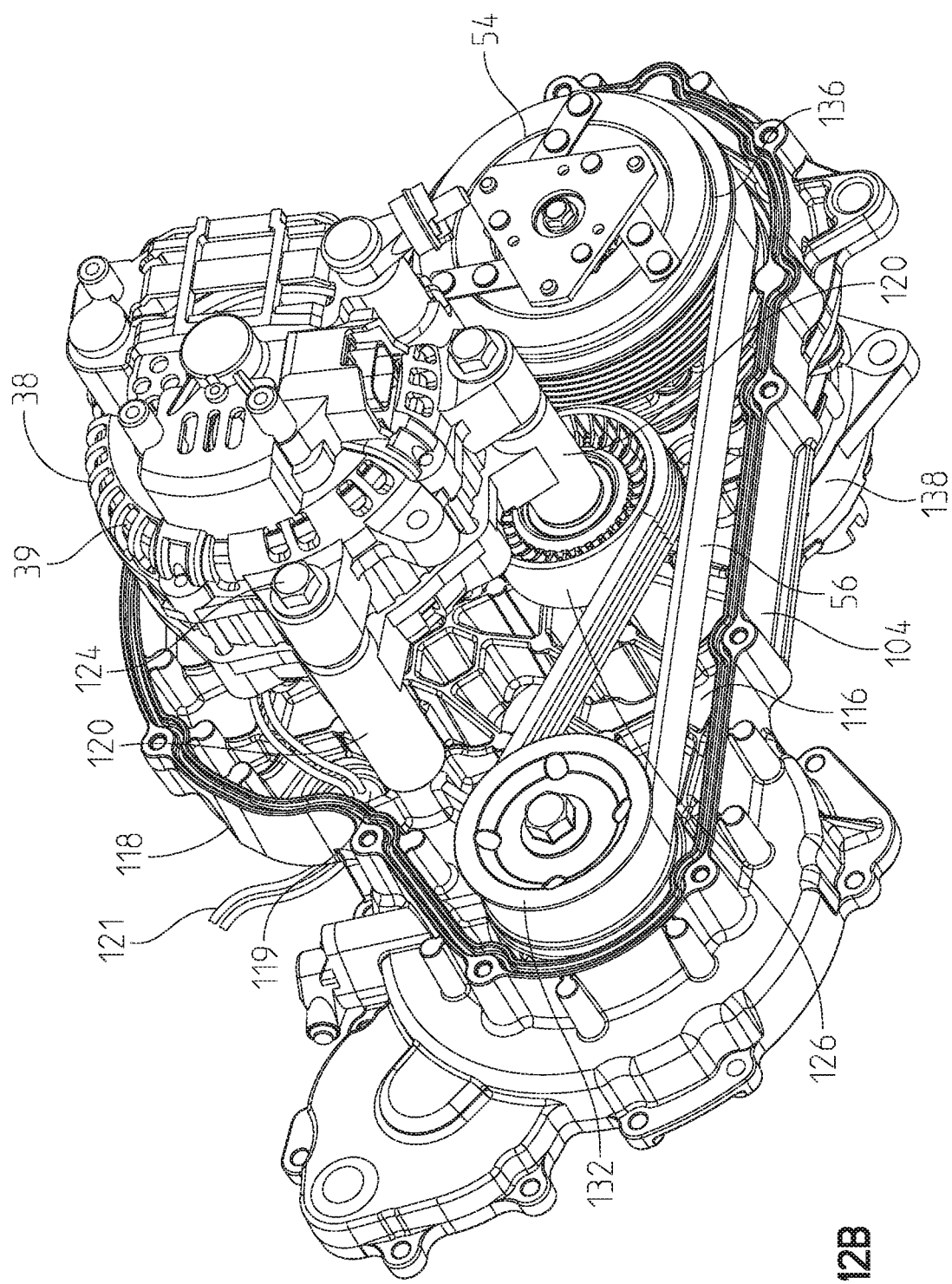
FIG. 12B is a rear right perspective view of the housing, the alternator, and the compressor of FIG. 12A with a portion of the housing removed.

As shown in FIGS. 12A and 12B, inner housing member 104 is configured as a support plate for coupling with compressor 54 of HVAC assembly 50 and alternator 38 of the electrical system. In one embodiment, inner housing member 104 may be comprised of die-cast aluminum. Illustratively, a first side 116 of inner housing member 104 is configured to support alternator 38 while compressor 54 is at least partially positioned on a second side 118 of inner housing member 104. Inner housing member 104 supports alternator 38 and compressor 54 on opposing sides thereof to allow for compact packaging and sealing of these components at rear end portion 16 of vehicle 2.

Alternator 38 includes at least one post 120 which aligns with apertures 122 on first side 116 of inner housing member 104. Fasteners 124 are received through posts 120 and thread into apertures 122 to secure alternator 38 on first side 116 of inner housing member 104. Alternator 38 is fully enclosed by and sealed within housing 52 such that when intermediate housing member 102 and outer housing member 100 are coupled to inner housing member 104, alternator 38 is surrounded and concealed by outer and intermediate housing members 100, 102. In this way, alternator 38 is not coupled to the crankcase of engine 42, but rather, is coupled to housing 52 which allows for compact packaging of components at read end portion 16 of vehicle 2 and may also be positioned to decrease the center of gravity of vehicle 2.

Figure 14:
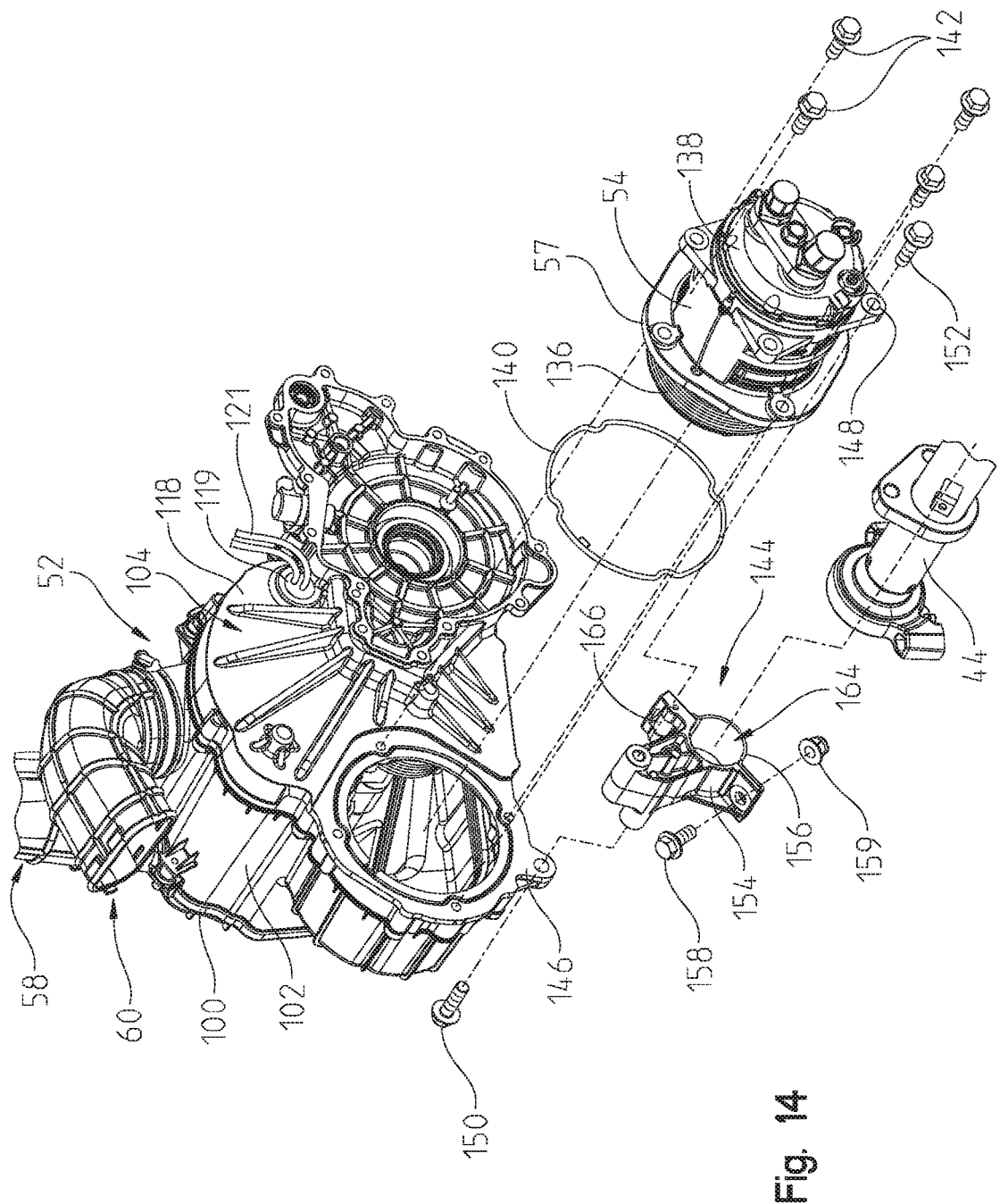
FIG. 14 is an exploded view of the housing and the compressor of FIG. 12B.

Because alternator 38 is part of the electrical system of vehicle 2, alternator 38 is coupled to other components of vehicle 2 via electrical lines or wires 121 (FIG. 14). Electrical lines 121 extend from alternator 38 to other components through opening 117 (FIG. 11) in inner housing member 104 but are sealed against inner housing member 104 with a grommet or seal 119 (FIG. 14).

One of posts 120 also is configured to align with idler pulley 126 of belt drive assembly 55 to couple idler pulley 126 to first side 116 of inner housing member 104 with fasteners 124. As such, idler pulley 126 may be positioned intermediate alternator 38 and inner housing member 104. A bushing 128 may be positioned within a central opening 130 of idler pulley 126 and extend at least partially into post 120 and a bushing 129 may be positioned within central opening 130 and aperture 122 when idler pulley 126 is coupled to inner housing member 104.

Referring still to FIGS. 12A and 12B, inner housing member 104 also is configured to support drive pulley 132 of belt drive assembly 55 which may be operably coupled to a crankshaft 180 of engine 42 (FIG. 18), as disclosed further herein. Drive pulley 132 may be rotatably coupled to idler pulley 126 through belt 56. Additionally, because belt 56 and pulleys 126, 132 are positioned within housing 52, belt drive assembly 55 is sealed by housing 52.

Belt 56 also is rotatably coupled to compressor 54 of HVAC assembly 50. Illustratively, compressor 54 extends through an opening 134 of inner housing member 104 such that a first end 136 of compressor 54 is positioned within housing 52 and a second end 138 of compressor 54 is positioned outside of second side 118 of housing 52, as shown in FIGS. 12 and 13. Compressor 54 is coupled to second side 118 of inner housing member 104 with fasteners 142 (FIG. 14). Compressor 54 is sealed to inner housing member 104 with a seal 140 positioned adjacent a sealing flange 57 (FIG. 14) of compressor 54 to prevent fluids, dirt, and debris from entering housing 52. As shown in FIG. 13, when compressor 54 and alternator 38 are coupled to inner housing member 104, alternator 38 is positioned in an upper central portion of inner housing member 104 and first end 136 of compressor 54 is positioned along a forward-most and lower-most portion of inner housing member 104. Additionally, idler pulley 126 is positioned generally longitudinally intermediate compressor 54 and drive pulley 132.

Figure 15:
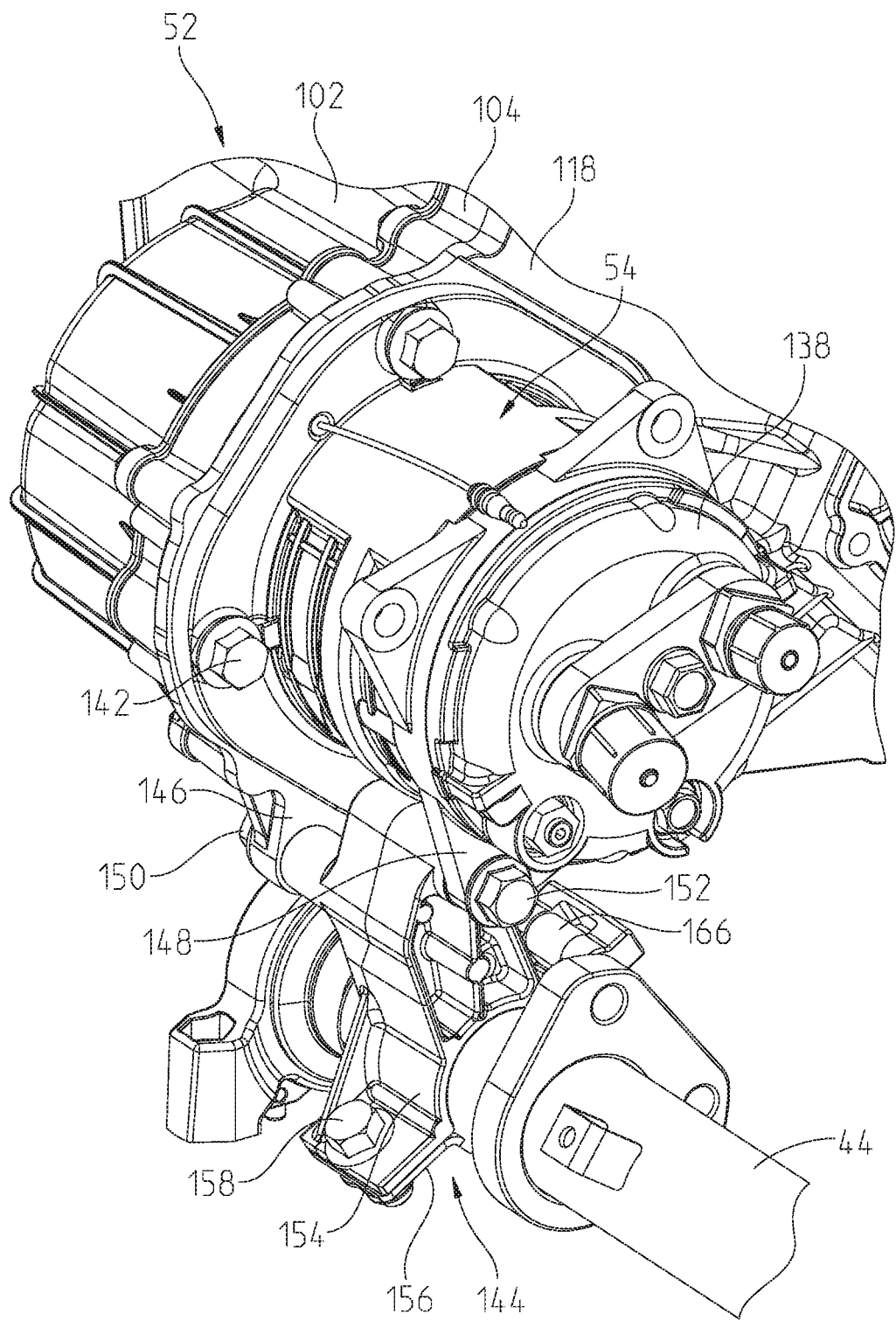
FIG. 15 is a front left perspective view of the compressor coupled to the housing of FIG. 14.
Figure 16:
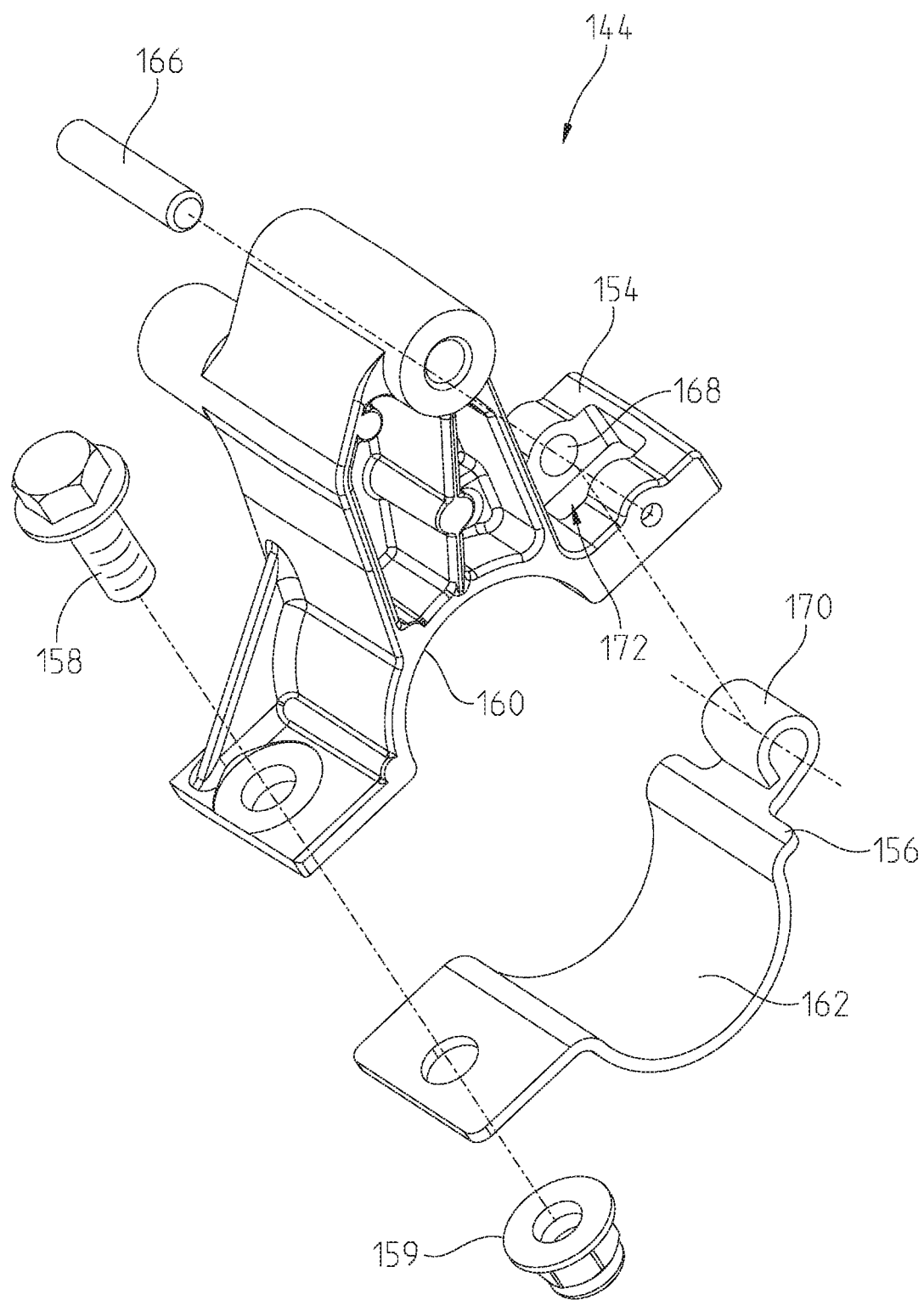
FIG. 16 is an exploded view of a mounting bracket for the compressor of FIG. 15.
Figure 17:
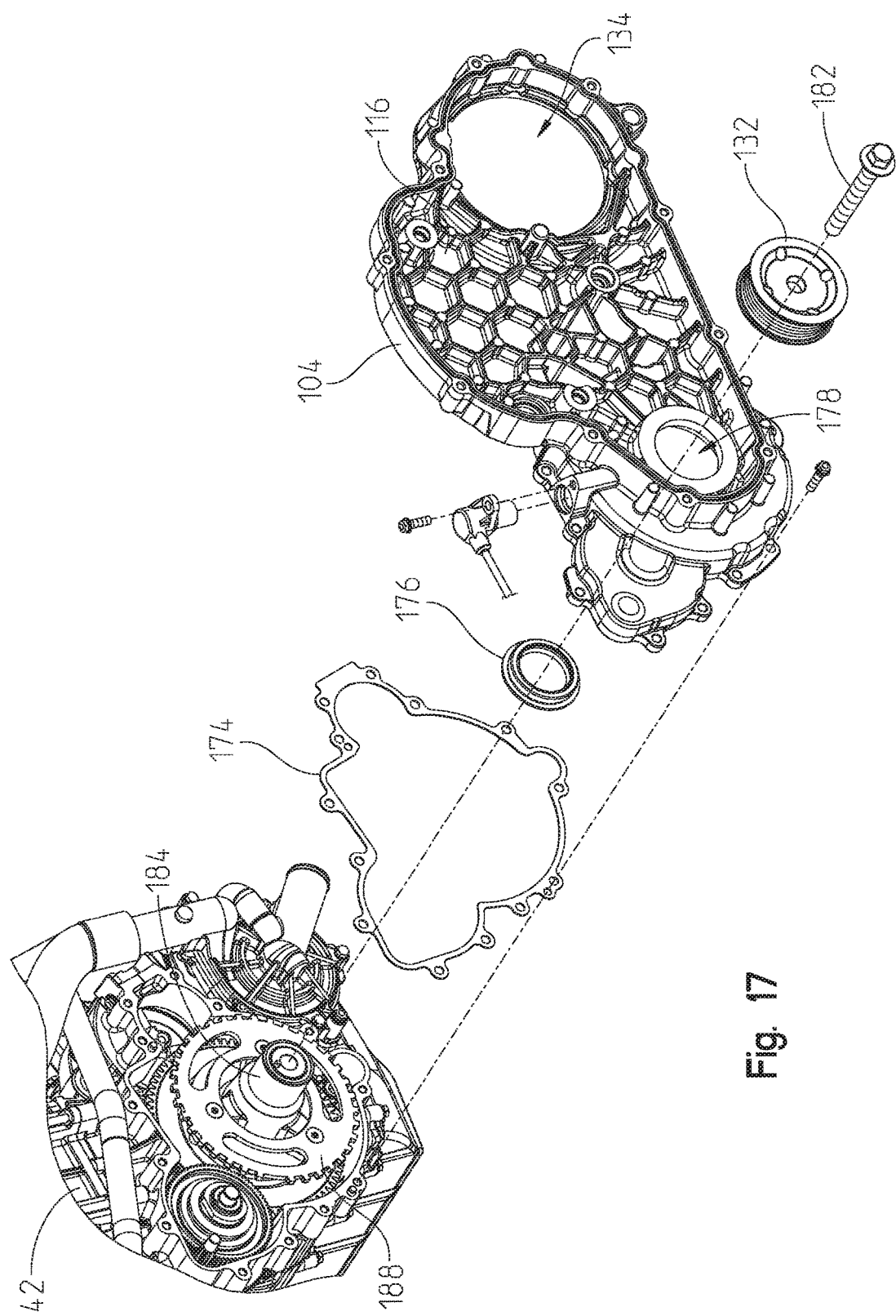
FIG. 17 is an exploded view of the support plate of the housing of FIG. 12 coupled to the powertrain assembly of FIG. 2.

Referring to FIGS. 14-16, in addition to housing 52, compressor 54 also is supported by and coupled to engine mount member 44. More particularly, a mounting bracket 144 is coupled to a flange 146 on inner housing member 104 with a fastener 150 and is coupled to a flange 148 on compressor 54 with a fastener 152. Mounting bracket 144 includes an upper bracket member 154 and a lower bracket member 156 which are coupled together with fasteners 158, 159. When upper and lower bracket members 154, 156 are coupled together, respective concave mounting surfaces 160, 162 cooperate to define an opening 164 for receiving engine mount member 44.

Upper and lower bracket members 154, 156 may be configured to rotate away from each other through a hinge pin 166 which is received through an opening 168 on upper bracket member 154. More particularly, lower bracket member 156 includes a cylindrical portion 170 which is received through a channel 172 of upper bracket member 154 and hinge pin 166 is configured to extend through opening 168 and cylindrical portion 170 to rotatably couple together upper and lower bracket members 154, 156. In this way, upper and lower bracket members 154, 156 may be configured to rotate about hinge pin 166 such that, when fasteners 158, 159 are removed, upper and lower bracket members 154, 156 remain coupled together through hinge pin 166 but allow mounting bracket 144 to be removed from engine mount member 44. For example, if compressor 54 needs to be serviced or replaced, fasteners 158, 159 may be removed from mounting bracket 144 and upper and lower bracket members 154, 156 may rotate away from each other and about hinge pin 166 to release mounting bracket 144 from engine mount member 44.

Figure 18:
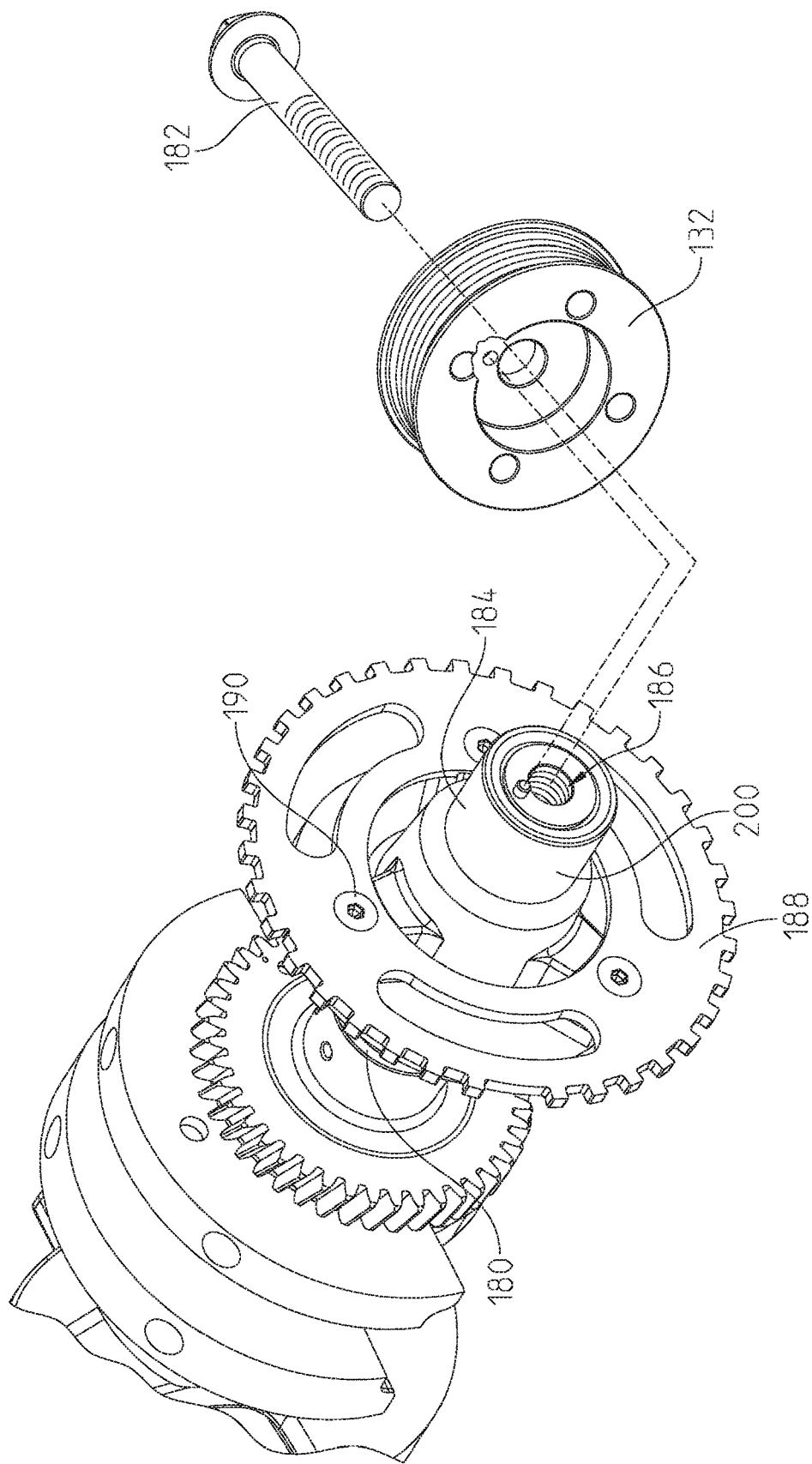
FIG. 18 is an exploded view of a pulley of a belt drive assembly and a crankshaft of the powertrain assembly of FIG. 2.
Figure 19:
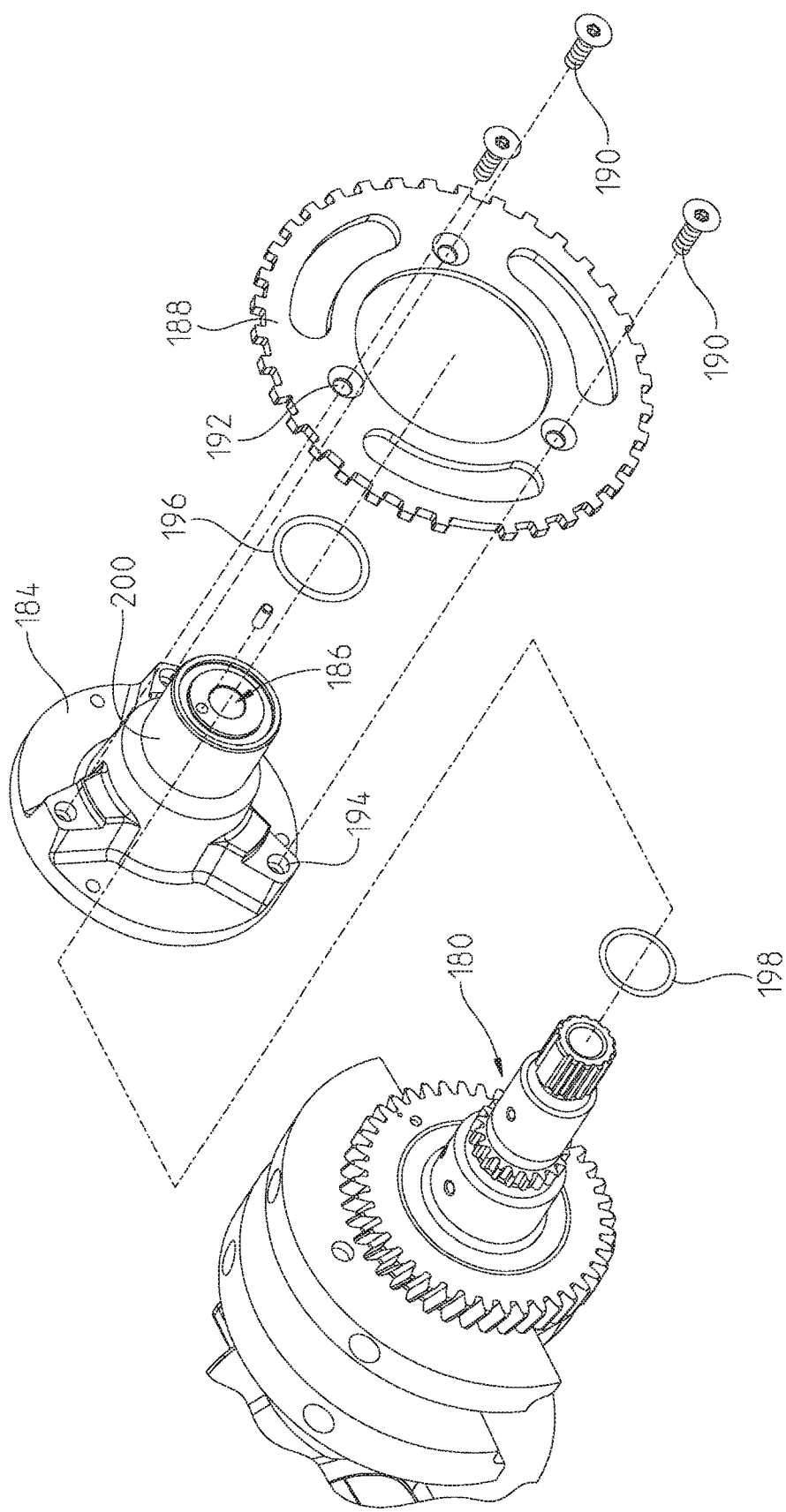
FIG. 19 is an exploded view of the pulley of the belt drive assembly, a timing wheel, an adapter, and the crankshaft of FIG. 18.

Referring now to FIGS. 17-20, housing 52 is sealingly coupled to engine 42 with a sealed support member 174 which includes an opening 176 configured to receive crankshaft 180 of engine 42 (FIG. 18). In this way, housing 52 is sealed to engine 42 such the fluids, dirt, and debris do not transfer from housing 52 to engine 42. When housing 52 is coupled to engine 42, an opening 178 of inner housing member 104 of housing 52 is configured to receive drive pulley 132. Drive pulley 132 is coupled to crankshaft 180 of engine 42 with crank bolt 182. More particularly, crank bolt 182 is received through a portion of drive pulley 132 and extends into an opening 186 of an adapter 184 which is positioned on crankshaft 180. As such, crank bolt 182 couples to crankshaft 180 through adapter 184.

Referring still to FIGS. 17-20, a timing wheel 188 of engine 42 is coupled to adapter 184 with fasteners 190. Fasteners 190 are received through openings 192 on timing wheel 188 and openings 194 on adapter 184 to couple timing wheel 188 to adapter 184. As shown best in FIG. 19, a friction washer 196 may be positioned on crankshaft 180 and adapter 184 for sealing therebetween and/or to prevent slip during engine acceleration to increase torque capacity and eliminate rattle. Additionally, a second seal 198 may be positioned on a protrusion 200 of adapter 184 to seal with drive pulley 132 when coupled together with crank bolt 182. Adapter 184 integrates timing wheel 188 onto crankshaft 180 so the engine control unit ("ECU") (not shown) knows the rotational position of crankshaft 180.

Figure 20:
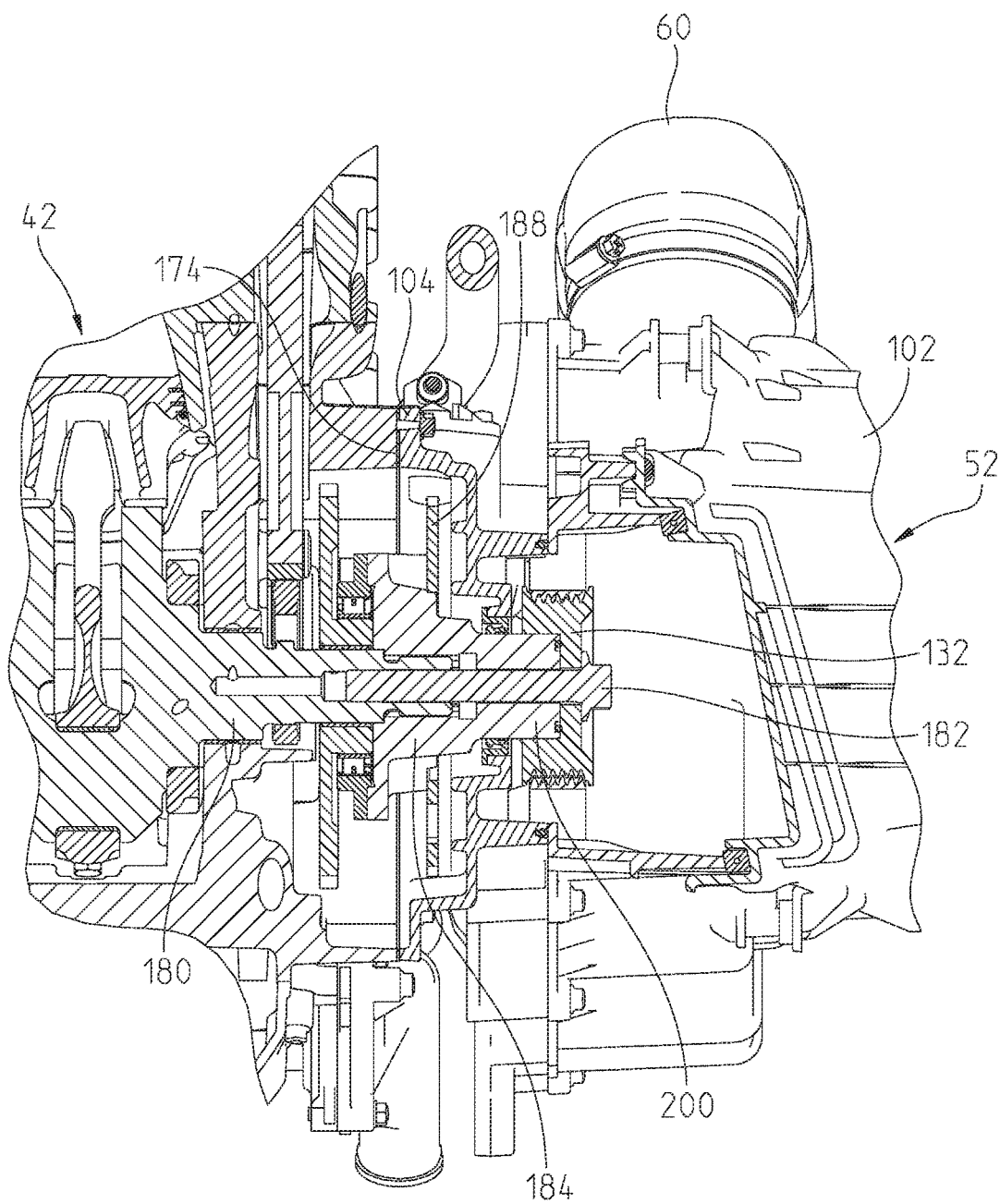
FIG. 20 is a cross-sectional view of the pulley of the belt drive assembly coupled to the crankshaft of FIG. 18.

As shown in FIG. 20, when housing 52 is coupled to engine 42, at least a portion of crankshaft 180, adapter 184, and timing wheel 188 are positioned within housing 52. Because drive pulley 132 is coupled to crankshaft 180, drive pulley 132 rotates with crankshaft 180. The rotation of drive pulley 132 then rotates drives belt 56 to rotate idler pulley 126 and drives compressor 54 and alternator 38.

Figure 21:
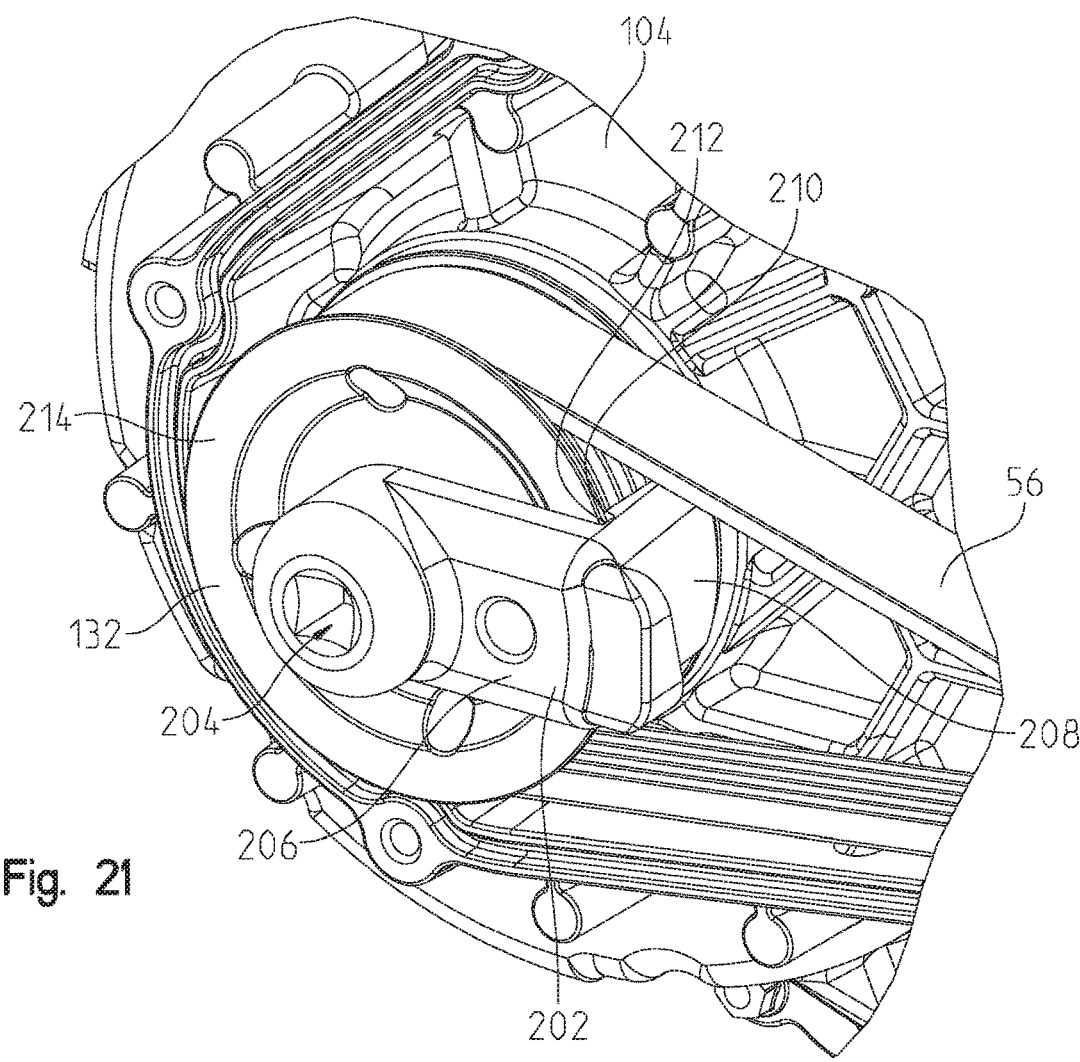
FIG. 21 is a front right perspective view of the pulley of the belt drive assembly coupled to an assembly tool for assembling the belt of the belt drive assembly onto the pulley.
Figure 22:
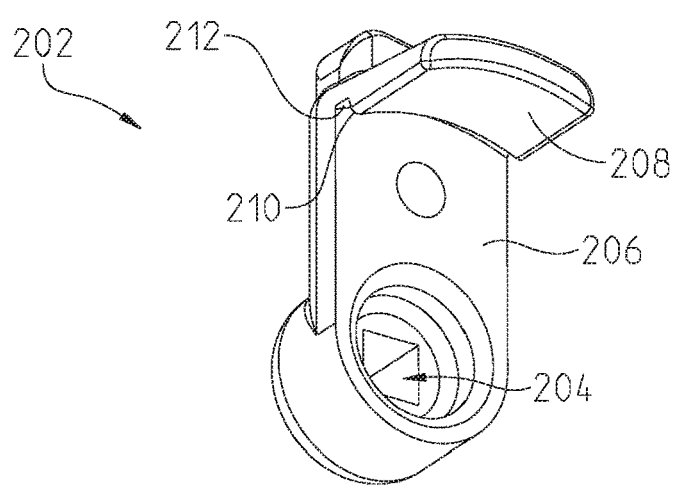
FIG. 22 is a rear perspective view of the assembly tool of FIG. 21.

Referring to FIGS. 21 and 22, belt drive assembly 55 does not include a tensioner and, as such, is configured as a tensioner-less drive belt assembly. In this way, belt drive assembly 55 may be compact and sealed within housing 52 without needing to increase the size of housing 52 to accommodate a tensioner. To maintain tension, belt 56 is undersized such that the inner diameter of belt 56 may be slightly less than the distance between pulleys 126, 132, alternator 38, and compressor 54. Because belt 56 is undersized, even if belt 56 wears over time, belt 56 is configured to maintain sufficient tension in belt drive assembly 55 over the operating life of engine 42.

To assemble belt 56 on drive pulley 132, an assembly tool 202 may be used, as shown in FIGS. 21 and 22. Assembly tool 202 includes a shaped center opening 204 which, illustratively, may be shaped to receive the head of crank bolt 182. For example center opening 204 may be ⅜ ratchet drive. Additionally, assembly tool 202 includes a first arm 206 and a second arm 208. Second arm 208 includes a shoulder 210, which when first and second arms 206, 208 are coupled together, forms a channel or groove 212. An outer flange 214 of drive pulley 132 is configured to be received within groove 212 such that assembly tool 202 clips onto or otherwise is removably coupled to drive pulley 132. Illustratively, first and second arms 206, 208 are positioned outside of drive pulley 132 when assembly tool 202 is coupled to drive pulley 132.

Because belt 56 is undersized, belt 56 may be applied to drive pulley 132 using assembly tool 202. More particularly, assembly tool 202 may be coupled to crankshaft 180 through crank bolt 182 and coupled onto drive pulley 132 through shoulder 212. Belt 56 may be applied to assembly tool 202 and assembly tool 202 then may be rotated counter-clockwise such that second arm 208 transfers belt onto drive pulley 132 through the rotation of assembly tool 202. After a full rotation of assembly tool 202, belt 56 is fully seated onto drive pulley 132 even though belt 56 is undersized relative to the distance between pulleys 126, 132, alternator 38, and compressor 54. In this way, assembly tool 202 sufficiently stretches belt 56 to apply belt 56 onto drive pulley 132.

In operation, when an operator initiates HVAC assembly 50, for example by turning on the air conditioning from operator controls (not shown) within operator area 24, compressor 54 is engaged. More particularly, crankshaft 180 of engine 42 rotates drive pulley 132 to drive compressor 54 through belt 56. Cooling gas (e.g., refrigerant) from evaporator housing 65 flows through a first hose 72a of cooling lines 72 and into compressor 54, where it is compressed, and transferred to condenser 62 via a second hose 72b. Metering valve 71 is configured to control flow of the cooling gas between evaporator housing 65 and compressor 54. Within condenser 62, the ambient air flows through pre-filter screen 78 to transform the refrigerant gas into liquid refrigerant. The air through pre-filter screen 78 exits condenser 62 and fan 76 and flows across engine 42. The liquid refrigerant then flows through receiver-drier 64 and a third hose 72c before flowing into evaporator housing 65. Warm air from operator area 24 flows into evaporator housing 65 through filter 66 which causes the refrigerant to vaporize and absorb the heat from the air. As such, the air is cooled and flows back into operator area 24 via vents 70. The refrigerant vapor then may flow back to compressor 54 through first hose 72a in order to provide continuous cooling to operator area 24.

The electrical system of vehicle 2 may be configured to turn off compressor 54 if the load on engine 42 is at a predetermined threshold while utility vehicle 2 is idling. More particularly, the ECU controls operation of HVAC assembly 50 based on predetermined load levels on engine 42. For example, during a hard acceleration (e.g., when the throttle is fully open), the ECU may shed load from accessories, such as HVAC assembly 50, to accommodate the demand/load on engine 42. In one embodiment, the ECU may de-clutch compressor 54 to prevent drag on engine 42 during high-load conditions. Additionally, the ECU may automatically turn off HVAC assembly 50 and/or other accessories if engine 42 or other components of powertrain assembly 40 overheat.

In one embodiment, the ECU may control operation of HVAC assembly 50 according to the following control routine or logic. During cranking and starting of engine 42, the ECU controls the output of the clutch (not shown) for compressor 54 and also controls output of fan 76 for condenser 62 based on the control routines or logic "Compressor Crank Purge" and "Starting AC Disable" disclosed herein.

Compressor Crank Purge

During the "Compressor Crank Purge" routine, compressor 54 is engaged during cranking of engine 42 in order to purge any liquid out of compressor 54 at low rpm. The ECU uses an input into a Calibration Table 1 to calculate the number of engine revolutions in which the compressor crank purge event shall be active. The ECU enables the clutch output for compressor 54 for the compressor crank purge event duration, as determined in Calibration Table 1 if both of the following conditions are satisfied: (1) tmot<tans+ ACCRNKPRGTMP, where "tmot" is the ECU's measurement for the coolant temperature for engine 42, "tans" is the ECU's measurement for the intake air temperature for engine 42, and "ACCRNKPRGTMP" is a calibration parameter for the offset temperature for compressor 54 to be active during the "Compressor Crank Purge" routine; and (2) system voltage>ACCRNKPRGVMN, where "ACCRNKPRGVMN" is a calibration parameter for a threshold battery voltage for compressor 54 to be active during the "Compressor Crank Purge" routine. The ECU also disables fan 76 of condenser 62 during the compressor crank purge event.

TABLE 1

| Calibration | | | | | | | | |
|---|---|---|---|---|---|---|---|---|
| Input | | | | | | | | |
| | −35 | −20 | −10 | 0 | 20 | 40 | 60 | 80 |
| Engine Revolutions | 0 | 0 | 0 | 0 | 2 | 2 | 2 | 2 |

Starting AC Disable

During the "Starting AC Disable" routine, the clutch for compressor 54 and fan 76 for condenser 62 are disabled regardless of any AC module command. More particularly, after the "Compressor Crank Purge" event has ended (i.e., the clutch output for compressor 54 is no longer enabled), the ECU disables both the clutch output for compressor 54 and fan 76 of condenser 62 for the duration of a starting event. When engine 42 has been started, the ECU continues to disable both the clutch output for compressor 54 and fan 76 of condenser 62 until the following two conditions are satisfied: (1) nmot>NSTNM, where "nmot" is the ECU's measurement of the speed of engine 42 in revolutions per minute and "NSTNM" is a calibration parameter for the speed (in rpm) threshold to define the end of starting engine 42; and (2) a subsequent duration of ACSTRTDELAY seconds have elapsed, where "ACSTRTDELAY" is a calibration parameter elated to the delay ability (in seconds) to turn on HVAC assembly 50 after starting engine 42.

The ECU also is configured to adjust the engine throttle based on an AC module command in order to hold power to ground-engaging members 4 constant. In other words, the ECU is configured to apply AC system load to drag torque during an "AC System Drag Torque Compensation" control routine or logic. More particularly, the ECU uses a Calibration Table 2 to determine the drag torque of the AC load as a function of RPM of engine 42. The ECU uses the output of the Calibration Table 2 as an additional factor of the overall draft torque model. The ECU also is configured to apply a calibration time delay, which may be labeled "ACCMPONDELAY" in a control routine or logic, to control the interaction between the enablement of the clutch output for compressor 54 and throttle response. "ACCMPONDELAY" is a calibration parameter related to the delay (in seconds) for engaging the clutch for compressor 54 after the user has provided an input or request which is configured to activate compressor 54. The range on this time delay value may be positive or negative (e.g., if load comes on faster than manifold pressure can respond). If "ACCMPONDELAY" is positive, the ECU is configured to engage the clutch output for compressor 54 immediately but delay the throttle response for a duration of "ACCMPONDELAY". However, if "ACCMPONDELAY" is negative, the ECU is configured to delay engagement of the clutch output of compressor 54 for a duration of "ACCMPONDELAY" but increase the throttle immediately.

TABLE 2

| Calibration | | | | | | | | |
|---|---|---|---|---|---|---|---|---|
| | RPM | | | | | | | |
| | 1250 | 2500 | 3000 | 4000 | 5000 | 6000 | 7000 | 8000 |
| AC Drag Torque (N-m) | 20 | 17 | 16 | 15 | 13 | 12 | 10 | 8 |

The ECU also is configured to apply a calibration time delay "ACCMPOFFDELAY" to control the interaction between disengagement of the clutch output of compressor 54 and the throttle response. "ACCMPOFFDELAY" is a calibration parameter related to the delay (in seconds) for disengaging the clutch for compressor 54 after the user has provided an input or request configured to disengage compressor 54. The range on this time delay value may be positive or negative (e.g., if the load drops off fastener than the manifold pressure can respond). If "ACCMPOFFDELAY" is positive, the ECU is configured to disable the clutch output of compressor 54 immediately but delay the throttle response for a duration of "ACCMPOFFDELAY". However, if "ACCMPOFFDELAY" is negative, the ECU is configured to delay disablement of the clutch output of compressor 54 for a duration of "ACCMPOFFDELAY" but decrease throttle immediately.

Various codes, control logic, or software programs configured with functionality to disable the clutch output of compressor 54 may use hysteresis calculations stored within a memory of the ECU. Additionally, the memory of the ECU also may store various delays for enabling fan 76 of condenser 62 as part of the torque drag model.

Based on the "AC System Drag Torque Compensation" control routine or logic disclosed herein, the AC system (both fan 76 and compressor 54) may be disabled if full engine load is requested using a "WOT AC Disable" control routine or logic. The "WOT AC Disable" routine may be comprehensively enabled and disabled in a single calibratable code word. More particularly, the ECU is configured to continuously calculate the percentage of throttle offset and the "rl" offset needed to compensate for the AC system load, based on the drag torque model. The "rl" offset is a calibration parameter for the relative load of engine 43 required to drive HVAC assembly 50 at the current engine speed. If the clutch output for compressor 54 and the output of fan 76 of condenser 62 are disabled due to any of the following "WOT AC Disable" conditions, the disablement shall be limited to a calibratable duration and a separate portion of the "WOT AC Disable" code word shall be implemented to enable or disable use of a maximum WOT disable time limit: (1) The ECU shall enable the clutch output of compressor 54 and the output of fan 76 of condenser 62 if all of the following conditions are true (a) the AC module command transitions from inactive to active; (b) wdkba<=(100%−% throttle offset), where "wdkba" is the engine percent throttle opening; or (c) rl<=(rl max−rl offset), wherein "rl" is the relative load of engine 42; or (2) The ECU shall disable the clutch output of compressor 54 and the output of fan 76 of condenser 62 if any of the following conditions are true: (a) wdkba=100%; or (b) rl=rl max. The ECU is configured to inhibit retriggering the clutch output of compressor 54 and the output of fan 76 by applying a time constant to prevent switching between on and off.

If engine 42 is overheating, the ECU is configured to disable both the clutch output for compressor 54 and the output of fan 76 of condenser 62. Additionally, the ECU is configured to enable a charge disable output of alternator 38, which disables alternator 38, while engine 42 is starting. The ECU may keep the charge disable output of alternator 38 enabled after engine 42 has started until "nmot" has exceeded "NSTNM" and an additional calibratable delay period has elapsed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
a plurality of ground-engaging members;
a frame supported by the ground-engaging members;
a powertrain assembly supported by the frame and including an engine;
an alternator coupled to the engine through a housing; and
a heating, ventilation, and air condition ("HVAC") assembly including a compressor operably coupled to the engine, the compressor being supported on a first side of the housing and the alternator being supported on a second side of the housing.

2. The utility vehicle of claim 1, wherein the powertrain assembly includes a belt drive assembly having a belt operably coupled to a crankshaft of the engine and the compressor is operated through rotation of the belt.

3. The utility vehicle of claim 2, wherein the belt drive assembly is tensioner-less.

4. The utility vehicle of claim 1, the housing includes an inner support plate and an outer cover and the alternator is positioned within the outer cover.

5. The utility vehicle of claim 4, wherein the alternator is entirely concealed between the inner support plate and the outer cover.

6. The utility vehicle of claim 4, wherein the outer cover is sealed against the inner support plate.

7. The utility vehicle of claim 4, wherein the housing further includes an intermediate cover positioned intermediate the outer cover and the inner support plate, a first seal positioned intermediate the outer cover and the intermediate cover, and a second seal positioned intermediate the inner support plate and the intermediate cover.

8. The utility vehicle of claim 7, wherein the outer cover includes an air inlet extending upwardly and the intermediate cover includes an air outlet extending upwardly.

9. The utility vehicle of claim 1, wherein a first portion of the compressor extends outwardly from the housing and a second portion of the compressor is positioned within the housing.

10. The utility vehicle of claim 1, wherein the housing includes an opening through which electrical lines of the alternator are configured to extend.

11. The utility vehicle of claim 10, wherein a sealing member is positioned between the electrical lines of the alternator and the housing.

12. The utility vehicle of claim 1, wherein the powertrain assembly includes a belt drive assembly, a portion of the belt drive assembly being positioned intermediate the alternator and the housing.

13. The utility vehicle of claim 12, wherein the belt drive assembly includes an idler pulley, the portion of the belt drive assembly positioned intermediate the alternator and the housing being the idler pulley.

14. The utility vehicle of claim 13, wherein the idler pulley is coupled to the first side of the housing.

15. The utility vehicle of claim 2, wherein the belt drive assembly includes an idler pulley and a support drive pulley, the idler pulley and the support drive pulley both being positioned within the housing.

16. The utility vehicle of claim 15, wherein the idler pulley and the support drive pulley are rotatably coupled through a belt.

17. The utility vehicle of claim 16, wherein the belt is also rotatably coupled to the compressor.

18. The utility vehicle of claim 1, wherein the compressor is further supported by and coupled to an engine mount member.

19. The utility vehicle of claim 1, wherein the housing is coupled to the engine with a sealed support member.

20. The utility vehicle of claim 1, wherein the engine includes a crankshaft, an adapter, and a timing wheel, at least a portion of the crankshaft, the adapter, and the timing wheel being positioned within the housing.

\* \* \* \* \*